(12) United States Patent
Zhu et al.

(10) Patent No.: US 10,157,071 B2
(45) Date of Patent: Dec. 18, 2018

(54) METHOD FOR MIGRATING A VIRTUAL MACHINE BETWEEN A LOCAL VIRTUALIZATION INFRASTRUCTURE AND A CLOUD-BASED VIRTUALIZATION INFRASTRUCTURE

(71) Applicant: VMware, Inc., Palo Alto, CA (US)

(72) Inventors: Xi Zhu, Sunnyvale, CA (US); Yu Xin, San Mateo, CA (US); Huadong Wang, San Francisco, CA (US); Radhika Rayadu Chopra, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 154 days.

(21) Appl. No.: 15/251,816

(22) Filed: Aug. 30, 2016

(65) Prior Publication Data
US 2018/0060102 A1    Mar. 1, 2018

(51) Int. Cl.
*G06F 9/455*    (2018.01)
(52) U.S. Cl.
CPC .. *G06F 9/45533* (2013.01); *G06F 2009/4557* (2013.01); *G06F 2009/45595* (2013.01)
(58) Field of Classification Search
CPC ............... G06F 9/45558; G06F 3/0482; G06F 3/04842; G06F 2009/45595; G06F 2009/4557
See application file for complete search history.

(56) References Cited

U.S. PATENT DOCUMENTS 5,357,621 A  10/1994  Cox
8,738,972 B1   5/2014  Bakman
(Continued)

OTHER PUBLICATIONS

Office Action dated Feb. 12, 2018 in U.S. Appl. No. 15/160,934.
Office Action dated Feb. 20, 2018 in U.S. Appl. No. 15/251,670.

*Primary Examiner* — Adam Lee
(74) *Attorney, Agent, or Firm* — Clayton, McKay & Bailey, PC

(57) ABSTRACT

In a computer-implemented method for migrating a virtual machine between a local virtualization infrastructure and a cloud-based virtualization infrastructure, within a graphical user interface for managing the local virtualization infrastructure, a first view comprising a control for migrating a virtual machine between the local virtualization infrastructure to the cloud-based virtualization infrastructure is displayed. Responsive to a receiving a user selection to migrate a virtual machine between the local virtualization infrastructure and the cloud-based virtualization infrastructure, a workflow for effectuating a migration of the virtual machine between the local virtualization infrastructure and the cloud-based virtualization infrastructure is displayed. Responsive to receiving a command to migrate the virtual machine between the local virtualization infrastructure and the cloud-based virtualization infrastructure at the workflow for effectuating a migration of the virtual machine between the local virtualization infrastructure and the cloud-based virtualization infrastructure, the virtual machine is migrated between the local virtualization infrastructure and the cloud-based virtualization infrastructure. Responsive to migrating the virtual machine between the local virtualization infrastructure and the cloud-based virtualization infrastructure, management of the virtual machine through the graphical user interface for managing the local virtualization infrastructure is provided.

18 Claims, 33 Drawing Sheets

(56) References Cited

U.S. PATENT DOCUMENTS

| | | | |
|---|---|---|---|
| 9,164,795 B1* | 10/2015 | Vincent | H04L 12/4633 |
| 2011/0055377 A1* | 3/2011 | Dehaan | G06F 9/4856 |
| | | | 709/224 |
| 2012/0180044 A1* | 7/2012 | Donnellan | H04L 61/2007 |
| | | | 718/1 |
| 2012/0221744 A1* | 8/2012 | Heywood | G06F 9/4862 |
| | | | 709/247 |
| 2013/0041871 A1 | 2/2013 | Das | |
| 2013/0041931 A1 | 2/2013 | Brand | |
| 2013/0297769 A1 | 11/2013 | Chang et al. | |
| 2013/0346619 A1* | 12/2013 | Panuganty | H04L 41/12 |
| | | | 709/226 |
| 2013/0346839 A1 | 12/2013 | Dinha | |
| 2014/0019621 A1* | 1/2014 | Khan | G06F 9/4856 |
| | | | 709/226 |
| 2014/0222493 A1 | 8/2014 | Mohan | |
| 2014/0337529 A1* | 11/2014 | Antony | H04L 45/22 |
| | | | 709/226 |
| 2014/0359001 A1 | 12/2014 | Dupoteau | |
| 2014/0366155 A1* | 12/2014 | Chang | G06F 21/10 |
| | | | 726/27 |
| 2015/0067112 A1* | 3/2015 | Gokhale | H04L 61/2007 |
| | | | 709/220 |
| 2015/0149211 A1 | 5/2015 | Ohad | |
| 2015/0317101 A1* | 11/2015 | Shiga | G06F 3/0605 |
| | | | 710/74 |
| 2015/0379430 A1 | 12/2015 | Dirac | |
| 2016/0048408 A1* | 2/2016 | Madhu | G06F 11/1458 |
| | | | 718/1 |
| 2016/0142485 A1* | 5/2016 | Mitkar | H04L 67/1097 |
| | | | 707/681 |
| 2016/0147952 A1 | 5/2016 | Garcia | |
| 2017/0003994 A1* | 1/2017 | Spinks | G06F 9/45558 |
| 2017/0006020 A1 | 1/2017 | Falodiya | |
| 2017/0026470 A1 | 1/2017 | Bhargava | |
| 2017/0097841 A1 | 4/2017 | Chang | |
| 2017/0220394 A1* | 8/2017 | Shim | G06F 9/5083 |

\* cited by examiner

FIG. 7E

| VM Name | Source | Destination | Migration Status | % Complete | Size | Time Left |
|---|---|---|---|---|---|---|
| VM-1-10 | Cluster-1 | VDC-PA-2 | Scheduled to migrate | - | 48.66 GB | - |
| VM-1-20 | Cluster-2 | VDC-PA-1 | Migrating in progress | 9% | 11.35 GB | 01:57:36 |
| VM-1-30 | Host -5 | VDC-PA-1 | Migrating in progress | 36% | 48.66 GB | 02:12:50 |
| VM-1-40 | VDC-PA-1 | Cluster-2 | Migrating in progress | 84% | 11.35 GB | 00:18:07 |
| VM-1-50 | Cluster-3 | VDC-DC-2 | Scheduled to switch over | - | 48.66 GB | - |
| VM-1-60 | Cluster-4 | VDC-DC-3 | Ready to switch over | 99% | 48.66 GB | 01:57:36 |
| VM-1-70 | Cluster-4 | VDC-DC-3 | Ready to switch over | 99% | 11.35 GB | 01:57:36 |
| VM-1-80 | VDC-PA-4 | Host -5 | Migrating in progress | 35% | 48.66 GB | 01:57:36 |
| VM-1-90 | VDC-PA-4 | Cluster-1 | Migrating in progress | 84% | 48.66 GB | 01:57:36 |
| VM-2-10 | VDC-DC-1 | Cluster-1 | Ready to switch over | 99% | 11.35 GB | 01:57:36 |
| VM-2-20 | Host -6 | VDC-DC-1 | Migrating in progress | 50% | 48.66 GB | 01:57:36 |
| VM-2-30 | Cluster-1 | VDC-PA-2 | Completed | 100% | 48.66 GB | - |
| VM-2-40 | Cluster-1 | VDC-PA-2 | Completed | 100% | 11.35 GB | - |
| VM-2-50 | Cluster-1 | VDC-PA-2 | Completed | 100% | 48.66 GB | - |
| VM-2-60 | Cluster-2 | VDC-PA-2 | Migration Failed | - | 48.66 GB | - |
| VM-2-70 | Host -6 | VDC-PA-2 | Completed | 100% | 11.35 GB | - |

```
┌─────────────────────────────────────────────────────────┐
│  DISPLAY, WITHIN A GRAPHICAL USER INTERFACE FOR         │
│  MANAGING THE LOCAL VIRTUALIZATION INFRASTRUCTURE, A    │
│  FIRST VIEW COMPRISING A CONTROL FOR CONNECTING THE     │
│  LOCAL VIRTUALIZATION INFRASTRUCTURE TO THE CLOUD-      │
│  BASED VIRTUALIZATION INFRASTRUCTURE. 810               │
└─────────────────────────────────────────────────────────┘
                            │
                            ▼
┌─────────────────────────────────────────────────────────┐
│  RESPONSIVE TO A RECEIVING A USER SELECTION TO CONNECT  │
│  THE LOCAL VIRTUALIZATION INFRASTRUCTURE TO THE CLOUD-  │
│  BASED VIRTUALIZATION INFRASTRUCTURE, DISPLAY AT LEAST  │
│  ONE WORKFLOW FOR EFFECTUATING A CONNECTION BETWEEN     │
│  THE LOCAL VIRTUALIZATION INFRASTRUCTURE AND THE CLOUD- │
│  BASED VIRTUALIZATION INFRASTRUCTURE. 820               │
│  ┌───────────────────────────────────────────────────┐  │
│  │  DISPLAY A SECURE TUNNEL CREATION WORKFLOW. 822   │  │
│  └───────────────────────────────────────────────────┘  │
│  ┌───────────────────────────────────────────────────┐  │
│  │  DISPLAY A NETWORK EXTENSION WORKFLOW. 824        │  │
│  └───────────────────────────────────────────────────┘  │
└─────────────────────────────────────────────────────────┘
                            │
                            ▼
┌─────────────────────────────────────────────────────────┐
│  GENERATE A SECURE TUNNEL BASED AT LEAST ON A SELECTED  │
│  REMOTE GATEWAY, A SELECTED NETWORK MANAGEMENT          │
│  SERVICE, AND A SELECTED LOCAL GATEWAY. 826             │
└─────────────────────────────────────────────────────────┘
                            │
                            ▼
┌─────────────────────────────────────────────────────────┐
│  EXTENDING A SELECTED PORT GROUP TO THE CLOUD-BASED     │
│  VIRTUALIZATION INFRASTRUCTURE BASED AT LEAST ON THE    │
│  SELECTED PORT GROUP AND THE SELECTED DESTINATION       │
│  GATEWAY. 828                                           │
└─────────────────────────────────────────────────────────┘
                            │
                            ▼
┌─────────────────────────────────────────────────────────┐
│  RESPONSIVE TO RECEIVING A COMMAND TO CONNECT THE       │
│  LOCAL VIRTUALIZATION INFRASTRUCTURE TO THE CLOUD-      │
│  BASED VIRTUALIZATION INFRASTRUCTURE, ESTABLISH A       │
│  CONNECTION BETWEEN THE LOCAL VIRTUALIZATION            │
│  INFRASTRUCTURE AND THE CLOUD-BASED VIRTUALIZATION      │
│  INFRASTRUCTURE. 830                                    │
└─────────────────────────────────────────────────────────┘
                            │
                            ▼
┌─────────────────────────────────────────────────────────┐
│  RESPONSIVE TO ESTABLISHING A CONNECTION BETWEEN THE    │
│  LOCAL VIRTUALIZATION INFRASTRUCTURE AND THE CLOUD-     │
│  BASED VIRTUALIZATION INFRASTRUCTURE, PROVIDE           │
│  MANAGEMENT OF THE LOCAL VIRTUALIZATION                 │
│  INFRASTRUCTURE AND THE CLOUD-BASED VIRTUALIZATION      │
│  INFRASTRUCTURE THROUGH THE GRAPHICAL USER INTERFACE.   │
│  840                                                    │
└─────────────────────────────────────────────────────────┘
```

DISPLAY A REMOTE GATEWAY SELECTION INTERFACE FOR RECEIVING A SELECTION OF A REMOTE GATEWAY OF A PLURALITY OF REMOTE GATEWAYS OF THE CLOUD-BASED VIRTUALIZATION INFRASTRUCTURE. *850*

DISPLAY A NETWORK MANAGEMENT SERVICES SELECTION INTERFACE FOR RECEIVING A SELECTION OF A NETWORK MANAGEMENT SERVICE OF THE LOCAL VIRTUALIZATION INFRASTRUCTURE. *852*

DISPLAY A LOCAL GATEWAY SELECTION INTERFACE FOR RECEIVING A SELECTION OF A LOCAL GATEWAY OF A PLURALITY OF LOCAL GATEWAYS OF THE LOCAL VIRTUALIZATION INFRASTRUCTURE. *854*

DISPLAY A SOURCE PORT GROUP SELECTION INTERFACE FOR RECEIVING A SELECTION OF A PORT GROUP OF THE LOCAL VIRTUALIZATION INFRASTRUCTURE FOR EXTENDING THE LOCAL VIRTUALIZATION INFRASTRUCTURE TO THE CLOUD-BASED VIRTUALIZATION INFRASTRUCTURE. *840*

DISPLAY A DESTINATION GATEWAY SELECTION INTERFACE FOR RECEIVING A SELECTION OF A DESTINATION GATEWAY OF THE CLOUD-BASED VIRTUALIZATION INFRASTRUCTURE TO EXTEND A SELECTED PORT GROUP OF THE LOCAL VIRTUALIZATION INFRASTRUCTURE TO THE CLOUD-BASED VIRTUALIZATION INFRASTRUCTURE. *842*

DISPLAY, WITHIN A GRAPHICAL USER INTERFACE FOR MANAGING THE LOCAL VIRTUALIZATION INFRASTRUCTURE, A FIRST VIEW COMPRISING A CONTROL FOR MIGRATING A VIRTUAL MACHINE BETWEEN THE LOCAL VIRTUALIZATION INFRASTRUCTURE TO THE CLOUD-BASED VIRTUALIZATION INFRASTRUCTURE. 910

RESPONSIVE TO A RECEIVING A USER SELECTION TO MIGRATE A VIRTUAL MACHINE BETWEEN THE LOCAL VIRTUALIZATION INFRASTRUCTURE AND THE CLOUD-BASED VIRTUALIZATION INFRASTRUCTURE, DISPLAY A WORKFLOW FOR EFFECTUATING A MIGRATION OF THE VIRTUAL MACHINE BETWEEN THE LOCAL VIRTUALIZATION INFRASTRUCTURE AND THE CLOUD-BASED VIRTUALIZATION INFRASTRUCTURE. 920

RESPONSIVE TO RECEIVING A COMMAND TO MIGRATE THE VIRTUAL MACHINE BETWEEN THE LOCAL VIRTUALIZATION INFRASTRUCTURE AND THE CLOUD-BASED VIRTUALIZATION INFRASTRUCTURE, MIGRATE THE VIRTUAL MACHINE BETWEEN THE LOCAL VIRTUALIZATION INFRASTRUCTURE AND THE CLOUD-BASED VIRTUALIZATION INFRASTRUCTURE. 930

MIGRATE THE VIRTUAL MACHINE FROM THE LOCAL VIRTUALIZATION INFRASTRUCTURE TO THE CLOUD-BASED VIRTUALIZATION INFRASTRUCTURE. 932

MIGRATE THE VIRTUAL MACHINE FROM THE CLOUD-BASED VIRTUALIZATION INFRASTRUCTURE TO THE LOCAL VIRTUALIZATION INFRASTRUCTURE. 934

RESPONSIVE TO ESTABLISHING A CONNECTION BETWEEN THE LOCAL VIRTUALIZATION INFRASTRUCTURE AND THE CLOUD-BASED VIRTUALIZATION INFRASTRUCTURE, PROVIDE MANAGEMENT OF THE LOCAL VIRTUALIZATION INFRASTRUCTURE AND THE CLOUD-BASED VIRTUALIZATION INFRASTRUCTURE THROUGH THE GRAPHICAL USER INTERFACE. 940

DISPLAY A MIGRATION DASHBOARD FOR PROVIDING STATUS INFORMATION ON THE MIGRATION OF THE VIRTUAL MACHINE. 942

```
┌─────────────────────────────────────────────────────┐
│ DISPLAY A SOURCE SELECTION VIEW WITHIN THE GRAPHICAL│
│  USER INTERFACE, THE SOURCE SELECTION VIEW FOR      │
│   RECEIVING A SELECTION OF A SOURCE OF THE MIGRATION.│
│                         950                         │
│  ┌───────────────────────────────────────────────┐  │
│  │ DISPLAY A SOURCE SELECTION CONTROL FOR ALLOWING A│ │
│  │ USER TO SELECT BETWEEN BROWSING BY PHYSICAL   │  │
│  │  COMPONENT AND BROWSING BY NETWORK.           │  │
│  │                   960                         │  │
│  └───────────────────────────────────────────────┘  │
│                         ▼                           │
│  ┌───────────────────────────────────────────────┐  │
│  │ RESPONSIVE TO RECEIVING A SELECTION OF BROWSING BY│
│  │  PHYSICAL COMPONENT, ENABLE BROWSING BY PHYSICAL │
│  │   COMPONENT WITHIN THE SOURCE SELECTION VIEW.  │  │
│  │                   962                         │  │
│  └───────────────────────────────────────────────┘  │
│                         ▼                           │
│  ┌───────────────────────────────────────────────┐  │
│  │ RESPONSIVE TO RECEIVING A SELECTION OF BROWSING BY│
│  │  NETWORK, ENABLE BROWSING BY NETWORK WITHIN THE│  │
│  │           SOURCE SELECTION VIEW.               │  │
│  │                   964                         │  │
│  └───────────────────────────────────────────────┘  │
└─────────────────────────────────────────────────────┘
                          ▼
┌─────────────────────────────────────────────────────┐
│ RESPONSIVE TO RECEIVING A SELECTION OF THE SOURCE OF│
│ THE MIGRATION, DISPLAY A VIRTUAL MACHINE SELECTION VIEW│
│   WITHIN THE GRAPHICAL USER INTERFACE, THE VIRTUAL  │
│    MACHINE SELECTION VIEW FOR RECEIVING A SELECTION OF A│
│        VIRTUAL MACHINE TO MIGRATE. 952              │
└─────────────────────────────────────────────────────┘
                          ▼
┌─────────────────────────────────────────────────────┐
│ RESPONSIVE TO RECEIVING A SELECTION OF THE VIRTUAL  │
│   MACHINE TO MIGRATE, DISPLAY A DESTINATION SELECTION│
│    VIEW WITHIN THE GRAPHICAL USER INTERFACE, THE    │
│ DESTINATION SELECTION VIEW FOR RECEIVING A SELECTION OF│
│       A DESTINATION OF THE MIGRATION. 954           │
└─────────────────────────────────────────────────────┘
                          ▼
┌─────────────────────────────────────────────────────┐
│ RESPONSIVE TO RECEIVING A SELECTION OF THE DESTINATION│
│  OF THE MIGRATION, DISPLAY A NETWORK SELECTION VIEW │
│    WITHIN THE GRAPHICAL USER INTERFACE, THE NETWORK │
│ SELECTION VIEW FOR RECEIVING A SELECTION OF NETWORK OF│
│  THE DESTINATION TO MIGRATE THE VIRTUAL MACHINE. 956│
└─────────────────────────────────────────────────────┘
                          ▼
┌─────────────────────────────────────────────────────┐
│     DISPLAY A STORAGE TIER SELECTION VIEW WITHIN THE│
│  GRAPHICAL USER INTERFACE, THE STORAGE TIER SELECTION│
│  VIEW FOR RECEIVING A SELECTION OF A STORAGE TIER FOR│
│            THE VIRTUAL MACHINE. 958                 │
└─────────────────────────────────────────────────────┘
```

*FIG. 9B*

METHOD FOR MIGRATING A VIRTUAL MACHINE BETWEEN A LOCAL VIRTUALIZATION INFRASTRUCTURE AND A CLOUD-BASED VIRTUALIZATION INFRASTRUCTURE

BACKGROUND

Virtual-machine technology essentially abstracts the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Within virtual servers as well as physical servers, virtual machines and virtual applications can be moved among multiple virtual or physical processors in order to facilitate load balancing and to collocate compatible virtual machines and virtual applications with respect to virtual and physical processors. Similarly, virtual machines and virtual applications can be moved among the virtual servers within a virtual data center as well as among physical servers within the underlying physical hardware within which virtual data centers are constructed. Migration of virtual machines and virtual applications within virtual data centers can also be used for load balancing, fault tolerance and high availability, and for many other purposes.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 7A-K illustrates views of an example graphical user interface for migrating a virtual machine between a local virtualization infrastructure and a cloud-based virtualization infrastructure, in accordance with various embodiments.

FIGS. 8A-C illustrate flow diagrams of example methods for connecting a local virtualization infrastructure with a cloud-based virtualization infrastructure, according to various embodiments.

FIGS. 9A and 9B illustrate flow diagrams of example methods for migrating a virtual machine between a local virtualization infrastructure and a cloud-based virtualization infrastructure, according to various embodiments.

DESCRIPTION OF EMBODIMENTS

Figure 1:
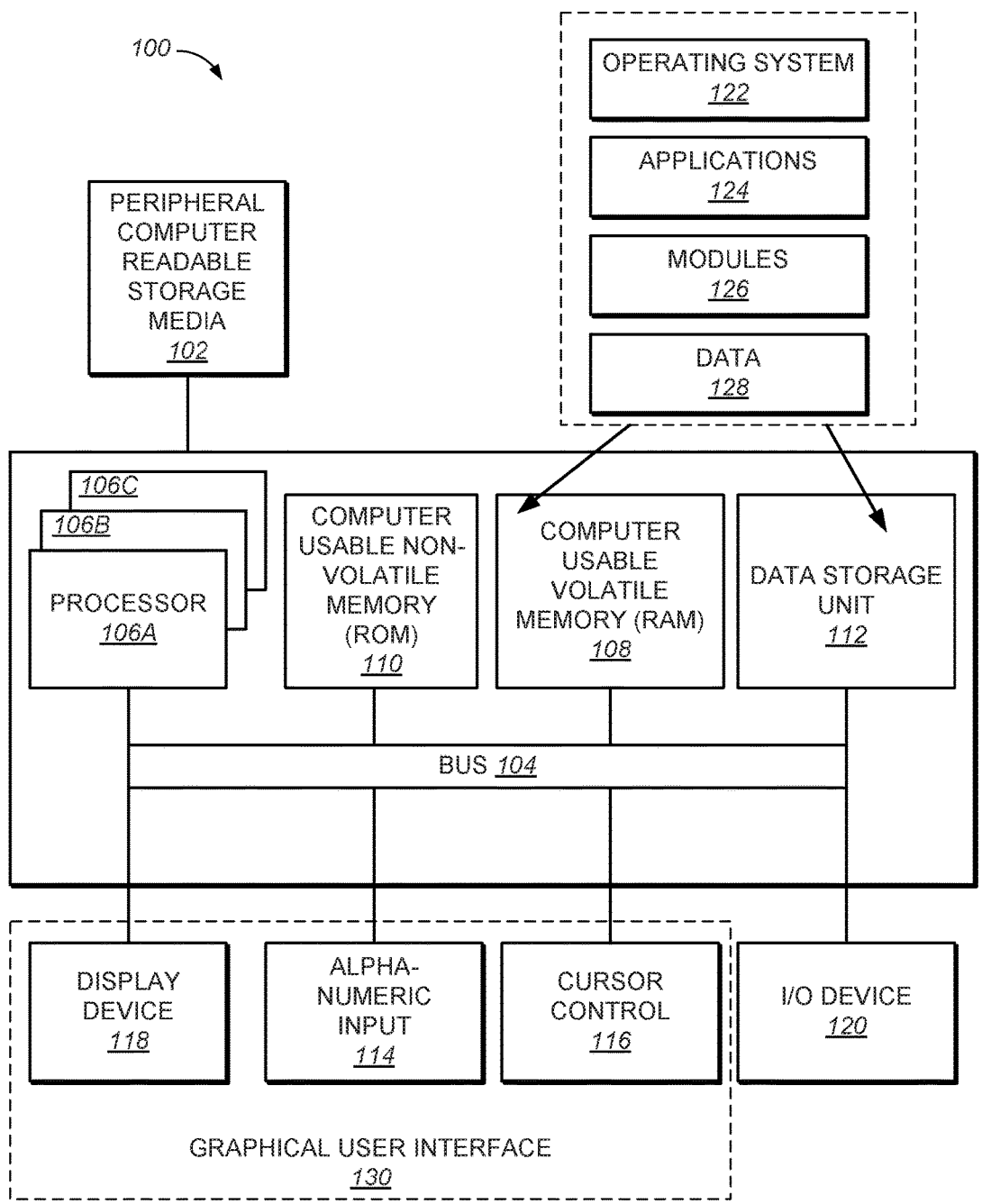
FIG. 1 illustrates an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device or system such as: a host processor, a processor, a memory, a virtual storage area network (USAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. An example cloud-based computing environment, upon which embodiments of the present invention may be implemented, is then discussed. Example graphical user interfaces and workflows associated with connecting a local virtualization infrastructure with a cloud-based virtualization infrastructure, in accordance with various embodiments, are then described. Example graphical user interfaces and workflows associated with migrating a virtual machine between a local virtualization infrastructure and a cloud-based virtualization infrastructure, in accordance with various embodiments, are then described. Example operations of the example graphical user interfaces and workflows are then described.

Example embodiments described herein provide a method for connecting a local virtualization infrastructure to a cloud-based virtualization infrastructure using a graphical user interface. Other example embodiments described herein provide a method for migrating a virtual machine between a local virtualization infrastructure to a cloud-based virtualization infrastructure using a graphical user interface. Various described embodiments provide methods and systems using graphical user interfaces for extending an internal network within a first cloud-computing facility to a second cloud-computing facility and deploying a virtual machine or virtual application previously running on a first cloud-computing facility within the context of the extended internal network in the second cloud-computing facility.

In one embodiment, a method for connecting a local virtualization infrastructure with a cloud-based virtualization infrastructure is described. A first view comprising a control for connecting the local virtualization infrastructure to the cloud-based virtualization infrastructure is displayed within a graphical user interface for managing the local virtualization infrastructure. Responsive to a receiving a user selection to connect the local virtualization infrastructure to the cloud-based virtualization infrastructure, at least one workflow for effectuating a connection between the local virtualization infrastructure and the cloud-based virtualization infrastructure is displayed. Responsive to receiving a command to connect the local virtualization infrastructure to the cloud-based virtualization infrastructure at the workflow for effectuating a connection between the local virtualization infrastructure and the cloud-based virtualization infrastructure, a connection between the local virtualization infrastructure and the cloud-based virtualization infrastructure is established according to the at least one workflow. Responsive to establishing a connection between the local virtualization infrastructure and the cloud-based virtualization infrastructure, management of the local virtualization infrastructure and the cloud-based virtualization infrastructure through the graphical user interface for managing the local virtualization infrastructure is provided.

In another embodiment, a computer-implemented method for migrating a virtual machine between a local virtualization infrastructure and a cloud-based virtualization infrastructure, within a graphical user interface for managing the local virtualization infrastructure, is described. A first view comprising a control for migrating a virtual machine between the local virtualization infrastructure to the cloud-based virtualization infrastructure is displayed. Responsive to a receiving a user selection to migrate a virtual machine between the local virtualization infrastructure and the cloud-based virtualization infrastructure, a workflow for effectuating a migration of the virtual machine between the local virtualization infrastructure and the cloud-based virtualization infrastructure is displayed. Responsive to receiving a command to migrate the virtual machine between the local virtualization infrastructure and the cloud-based virtualization infrastructure at the workflow for effectuating a migration of the virtual machine between the local virtualization infrastructure and the cloud-based virtualization infrastructure, the virtual machine is migrated between the local virtualization infrastructure and the cloud-based virtualization infrastructure. Responsive to migrating the virtual machine between the local virtualization infrastructure and the cloud-based virtualization infrastructure, management of the virtual machine through the graphical user interface for managing the local virtualization infrastructure is provided.

Modern computing can be considered to be a collection of many different levels of abstraction above the physical computing-hardware level that includes physical computer systems, data-storage systems and devices, and communications networks. Embodiments described herein are related to a multi-cloud-aggregation level of abstraction that provides homogenous-cloud and heterogeneous-cloud distributed management services, each cloud generally an abstraction of a large number of virtual resource pools comprising processing, storage, and network resources, each of which, in turn, can be considered to be a collection of abstractions above underlying physical hardware devices. Embodiments described herein are directed to a graphical user interface including workflows that provide straightforward and efficient methods for connecting a local virtualization infrastructure with a cloud-based virtualization infrastructure and for the migration of virtual machines and virtual applications between the local virtualization infrastructure and the cloud-based virtualization infrastructure.

Designers, developers, vendors, and users of virtualization technology continue to seek new facilities within emerging layers of virtualization for movement of virtual machines and virtual applications in order to achieve many different types of goals, from load balancing, fault tolerance, and high availability to minimization of costs, efficient geographic distribution, and other such goals. For example, U.S. Pat. No. 9,311,140 by Raghu, et al., assigned to VMware, Inc., and incorporated herein by reference, discloses methods and systems for extending an internal network within a first cloud-computing facility to a second cloud-computing facility and deploying a virtual machine or virtual application previously running on a first cloud-computing facility within the context of the extended internal network in the second cloud-computing facility. The described methods and systems provide internal-network extension and redeployment of virtual machines and virtual applications, referred to as "stretch deploy," allow a virtual machine or virtual application formerly executing on a first cloud-computing facility to resume execution on a second cloud-computing facility, using the computational and storage facilities of the second cloud-computing facility but depending on network support from the first cloud-computing facility, without changing IP and local network addresses and the network connectivity, based on those addresses, between the virtual machines and virtual applications and other local and remote computational entities with which the virtual machines and virtual applications communicate.

Embodiments described herein provide methods of management of a virtualization infrastructure, both on-premises and off-premises by integrating the management of the off-premises instance of the virtualization infrastructure into the management graphical user interface of the on-premises instance of the virtualization infrastructure. For example, embodiments described herein provide a method for connecting a local virtualization infrastructure with a cloud-based virtualization infrastructure, for centralized management. In further examples, embodiments described herein provide methods for migrating virtual machines and/or virtual applications between the local virtualization infrastructure and the cloud-based virtualization infrastructure. As described herein, the management of these operations is provided by a graphical user interface of the local virtualization infrastructure.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Cloud-Based Computing Environment

Example embodiments described herein provide a method for connecting a local virtualization infrastructure to a cloud-based virtualization infrastructure using a graphical user interface. Other example embodiments described herein provide a method for migrating a virtual machine between a local virtualization infrastructure to a cloud-based virtualization infrastructure using a graphical user interface. Various described embodiments provide methods and systems using graphical user interfaces for extending an internal network within a first cloud-computing facility to a second cloud-computing facility and deploying a virtual machine or virtual application previously running on a first cloud-computing facility within the context of the extended internal network in the second cloud-computing facility.

The various described methods and systems, which provide workflows of graphical user interfaces for effectuating internal-network extension and redeployment of virtual machines and virtual applications, allow a virtual machine or virtual application formerly executing on a first cloud-computing facility to resume execution on a second cloud-computing facility, using the computational and storage facilities of the second cloud-computing facility but depending on network support from the first cloud-computing facility. For example, various embodiments provide for effectuating a connection a cloud-based virtualization infrastructure using a graphical user interface such that virtual machines and/or virtual applications can be migrated between a local virtualization infrastructure and a cloud-based virtualization infrastructure without changing IP and local network addresses and the network connectivity, based on those addresses, between the virtual machines and virtual applications and other local and remote computational entities with which the virtual machines and virtual applications communicate.

Figure 2:
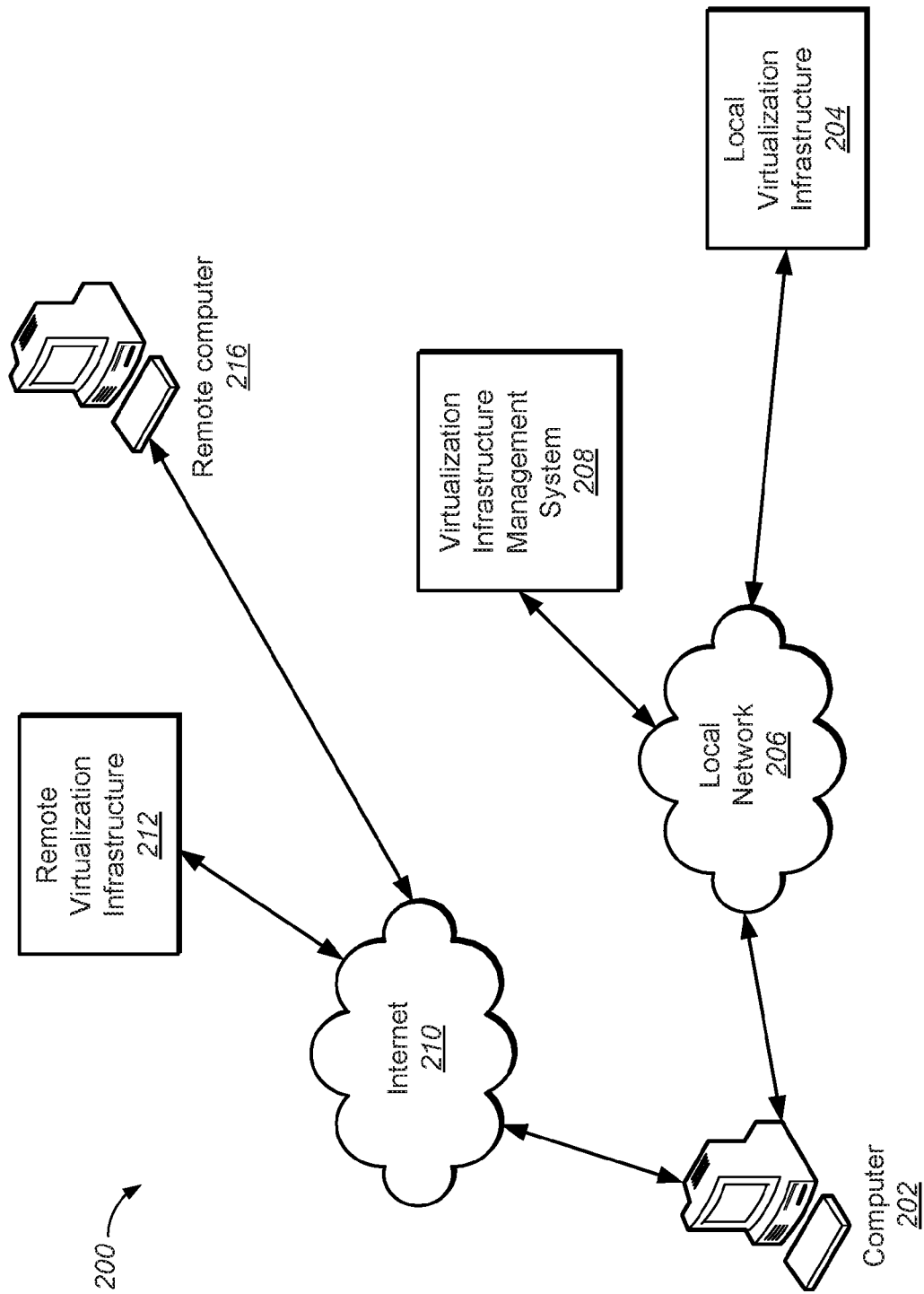
FIG. 2 illustrates an example cloud-based computing environment upon which embodiments described herein may be implemented.

FIG. 2 illustrates an example cloud-based computing environment 200 upon which embodiments described herein may be implemented. In the recently developed cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 2, a system administrator for an organization, using a computer system 202, accesses the organization's local virtualization infrastructure 204 (e.g., a private cloud) through a local network 206 and also accesses, through the Internet 210, a remote virtualization infrastructure 212 (e.g., a public cloud). In various embodiments, access to local virtualization infrastructure 204 is through a private cloud services interface and/or access to remote virtualization infrastructure 212 is through a public cloud services interface.

It should be appreciated that that local virtualization infrastructure 204 can be any type of virtualization infrastructure (e.g., VMware vSphere™), that remote virtualization infrastructure 212 can be any type of virtualization infrastructure (e.g., VMware vCloud Air) and that virtualization infrastructure management system 208 can be any type of system for managing and creating components of a virtualization infrastructure (e.g., VMware vSphere™ VCenter™ or vCloud Air Web Portal).

For example, the administrator can, in either the case of local virtualization infrastructure 204 or remote virtualization infrastructure 212, using virtualization infrastructure management system 208, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote computer system 216.

Cloud-computing facilities may provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

In accordance with various embodiments, a GUI including workflows for effectuating a connection between a local virtualization infrastructure to a cloud-based virtualization infrastructure and/or for effectuating a migration of a virtual machine between the local virtualization infrastructure and the cloud-based virtualization infrastructure is described. In one embodiment, virtualization infrastructure management system 208 is configured to provide for the creation and management of components of local virtualization infrastructure 204 and/or remote virtualization infrastructure 212, such as virtual machines or virtual applications. It should be appreciated that the operations of virtualization infrastructure management system 208 may be distributed across local virtualization infrastructure 204 and/or remote virtualization infrastructure 212. For purposes of simplicity, embodiments described herein are directed toward the use a GUI (e.g., a GUI accessed via computer system 202) in providing management of operations of virtualization infrastructure management system 208 on local virtualization infrastructure 204 and remote virtualization infrastructure 212.

In one embodiment, virtualization infrastructure management system 208 is configured to provide the creation of a virtual machine. In facilitating the creation of a virtual machine, a GUI is displayed that provides for user configuration of various parameters of the virtual machine. For example, a GUI may present selectable parameters including CPU capacity and memory capacity for the virtual machine. The GUI may also present other selectable parameters, such as storage capacity, as well as projected costs for various selections.

Example Graphical User Interface and Workflows for Connecting a Local Virtualization Infrastructure with a Cloud-Based Virtualization Infrastructure Example embodiments described herein provide a method for connecting a local virtualization infrastructure to a cloud-based virtualization infrastructure using a graphical user interface. FIGS. 3A-G illustrates views of an example graphical user interface 300 for connecting a local virtualization infrastructure with a cloud-based virtualization infrastructure, in accordance with various embodiments. It should be appreciated that graphical user interface 300 is associated with a local virtualization infrastructure (e.g., on-premises virtualization infrastructure), and is used to effectively extend the local virtualization infrastructure by connecting to a cloud-based virtualization infrastructure (e.g., off-premises virtualization infrastructure).

It should be appreciated that GUIs may be designed to provide a particular interactive experience based on the type of information presented and/or received through the GUI. Moreover, a GUI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a GUI are typically design decisions, where a GUI designer might attempt to provide particular elements to present and/or receive particular types of information. For example, a simple GUI may include a drop-down list, where a user would select an item from the drop down list.

Figure 3A:
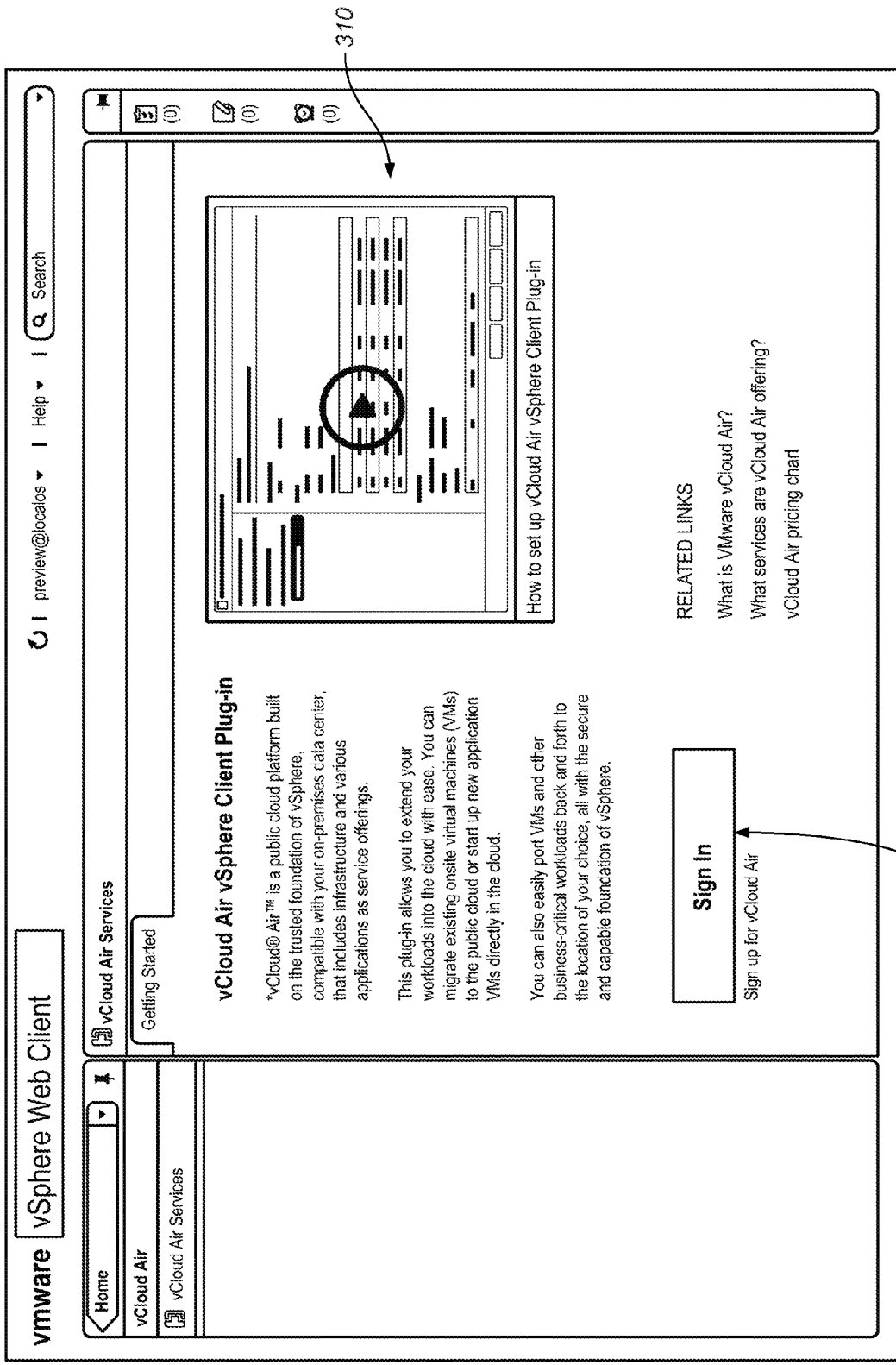
FIGS. 3A-G illustrates views of an example graphical user interface for connecting a local virtualization infrastructure with a cloud-based virtualization infrastructure, in accordance with various embodiments.

FIG. 3A illustrates a view 310 of an example introductory screen of graphical using interface 300. View 310 is displayed in response to receiving a user access to a cloud-based virtualization infrastructure service management plugin through graphical user interface 300. For example, as illustrated, graphical user interface 300 is associated with the VMware's vSphere Web Client for managing a local virtualization infrastructure. View 310 provides access to a plugin (e.g., VMware's vCloud Air vSphere Client Plug-in as illustrated) for connecting a local virtualization infrastructure to a cloud-based virtualization infrastructure. As illustrated, view 310 provides explanatory information on the use and operation of the cloud-based virtualization infrastructure service management plugin, including an explanation video and related links. It should be appreciated that the explanatory information as illustrated in view 310 is an example, and that any type of explanatory information on the use and/or benefits of accessing the cloud-based virtualization infrastructure services may be provided.

Figure 3B:
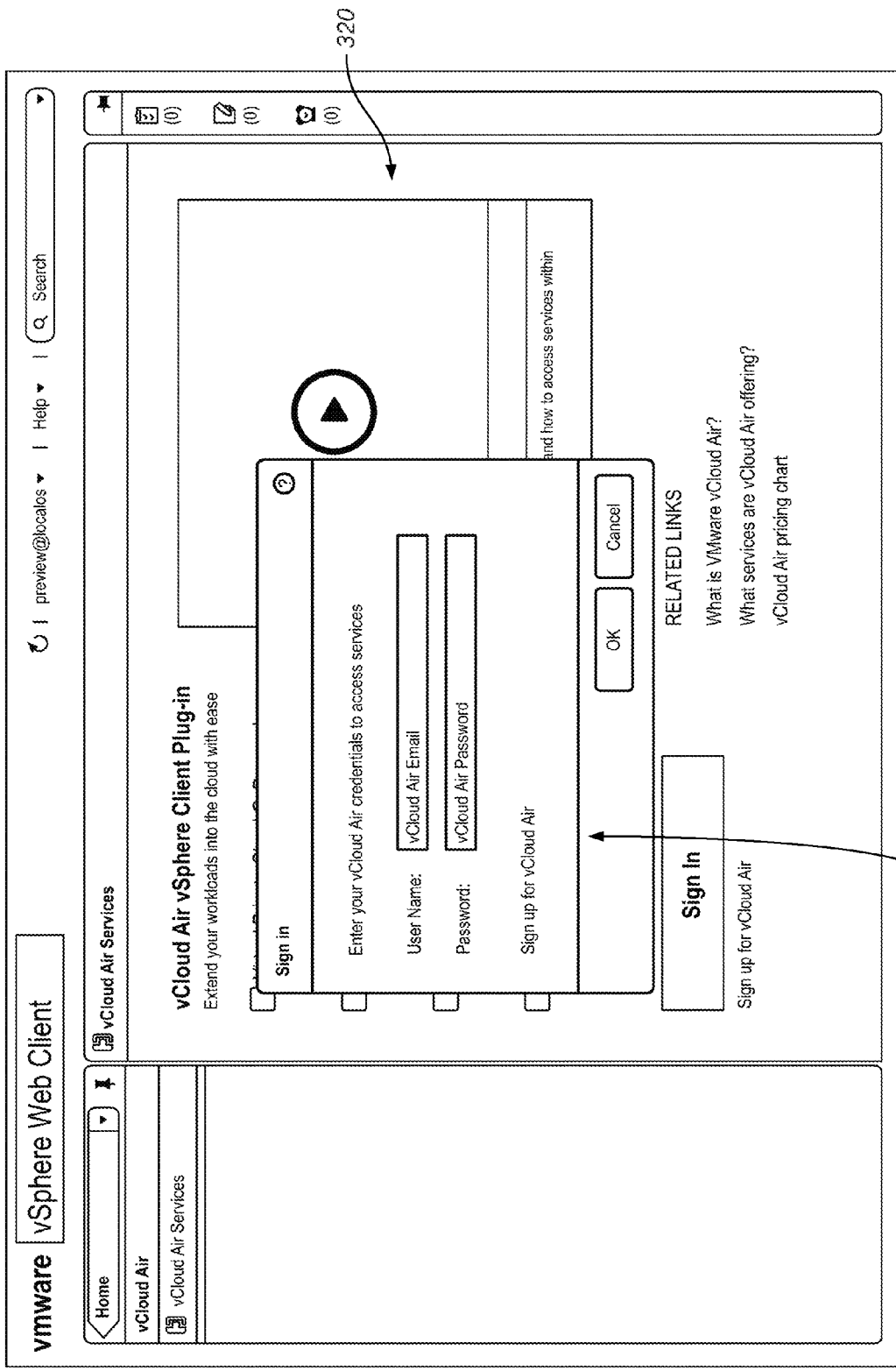

Interacting with sign-in control 312 allows a user to access the cloud-based virtualization infrastructure services for extending the local virtualization infrastructure. FIG. 3B illustrates a view 320 of graphical user interface 300 that is displayed in response to receiving a user interaction with sign-in control 312. View 320 includes a pop-up window 314 including text fields for signing in to the cloud-based virtualization infrastructure services. As illustrated, the portion of the view 320 behind pop-up window 314 is grayed out.

Figure 3C:
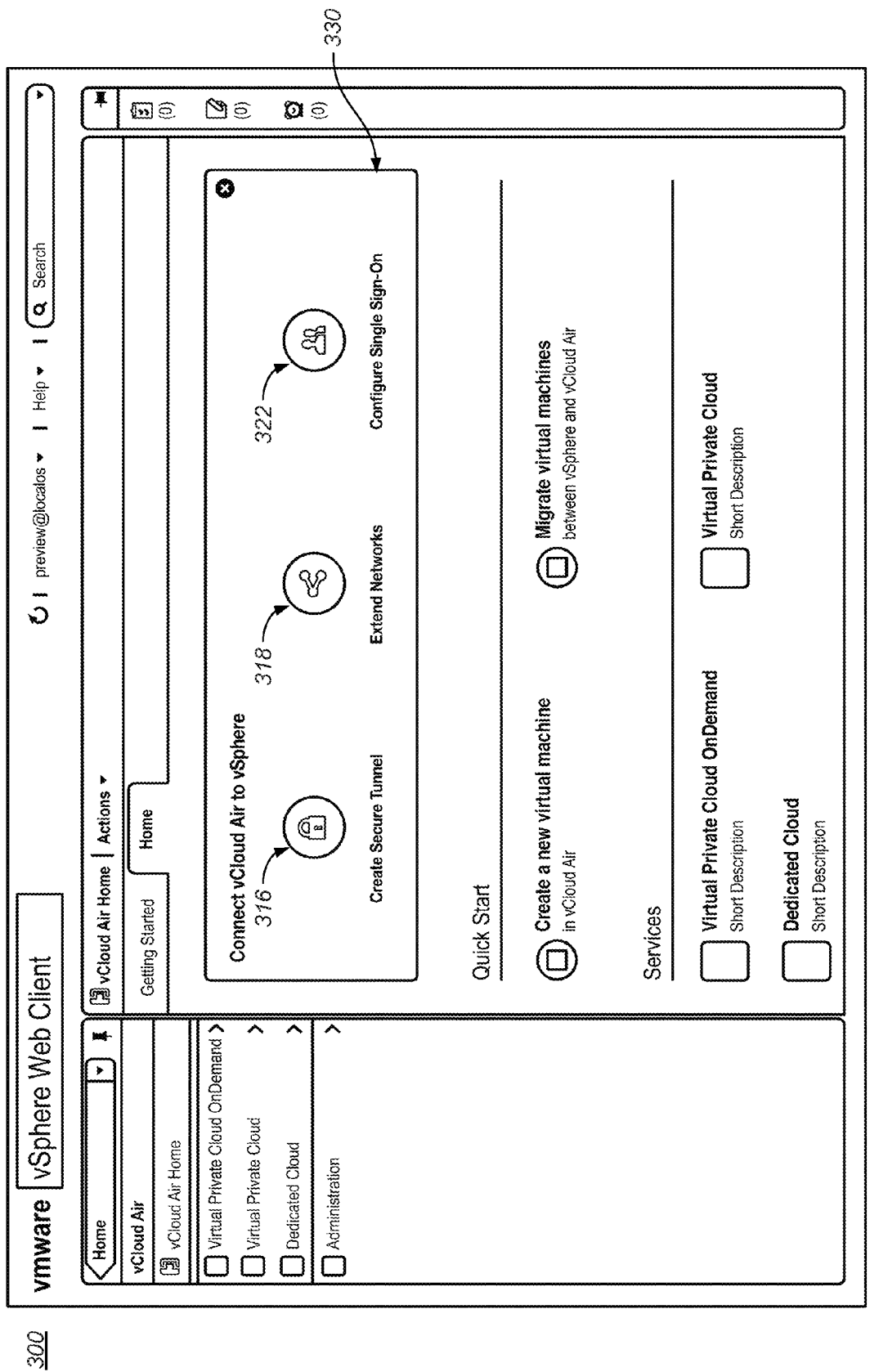

FIG. 3C illustrates view 330 of graphical user interface 300 that is displayed in response to a user accessing the cloud-based virtualization infrastructure services (e.g., by signing in at view 320). View 330 includes controls for connecting the local virtualization infrastructure to the cloud-based virtualization infrastructure. Control 316 allows a user to create a secure tunnel between the local virtualization infrastructure and the cloud-based virtualization infrastructure. Control 318 allows a user to extend the networks of the local virtualization infrastructure to the cloud-based virtualization infrastructure. Control 322 allows a user to configure a single sign-on for accessing both the local virtualization infrastructure and the cloud-based virtualization infrastructure. It should be appreciated that controls 316, 318 and 322 are examples of controls, and that view 330 may include different and/or additional controls as well.

Figure 3D:
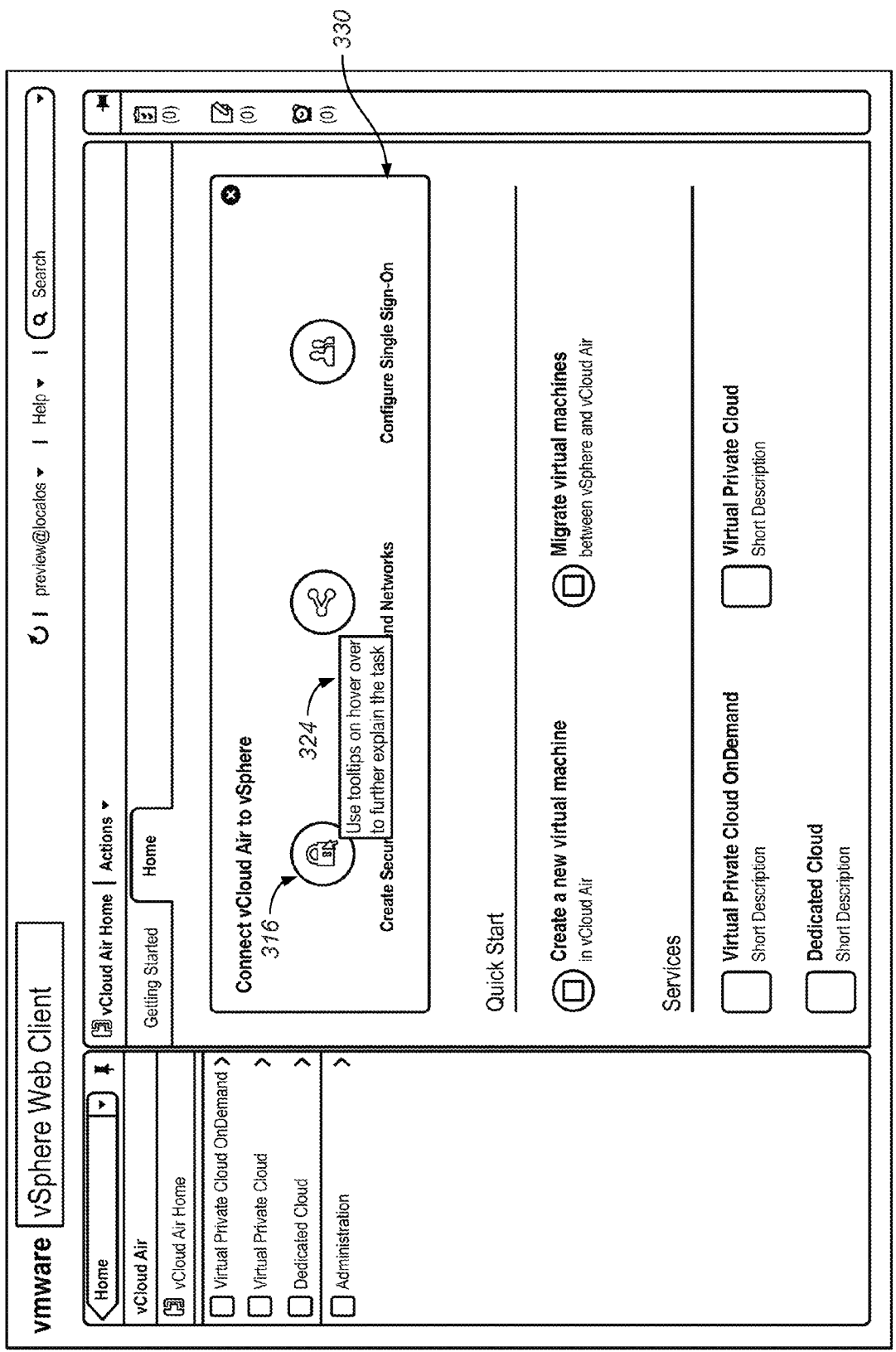
Figure 3E:
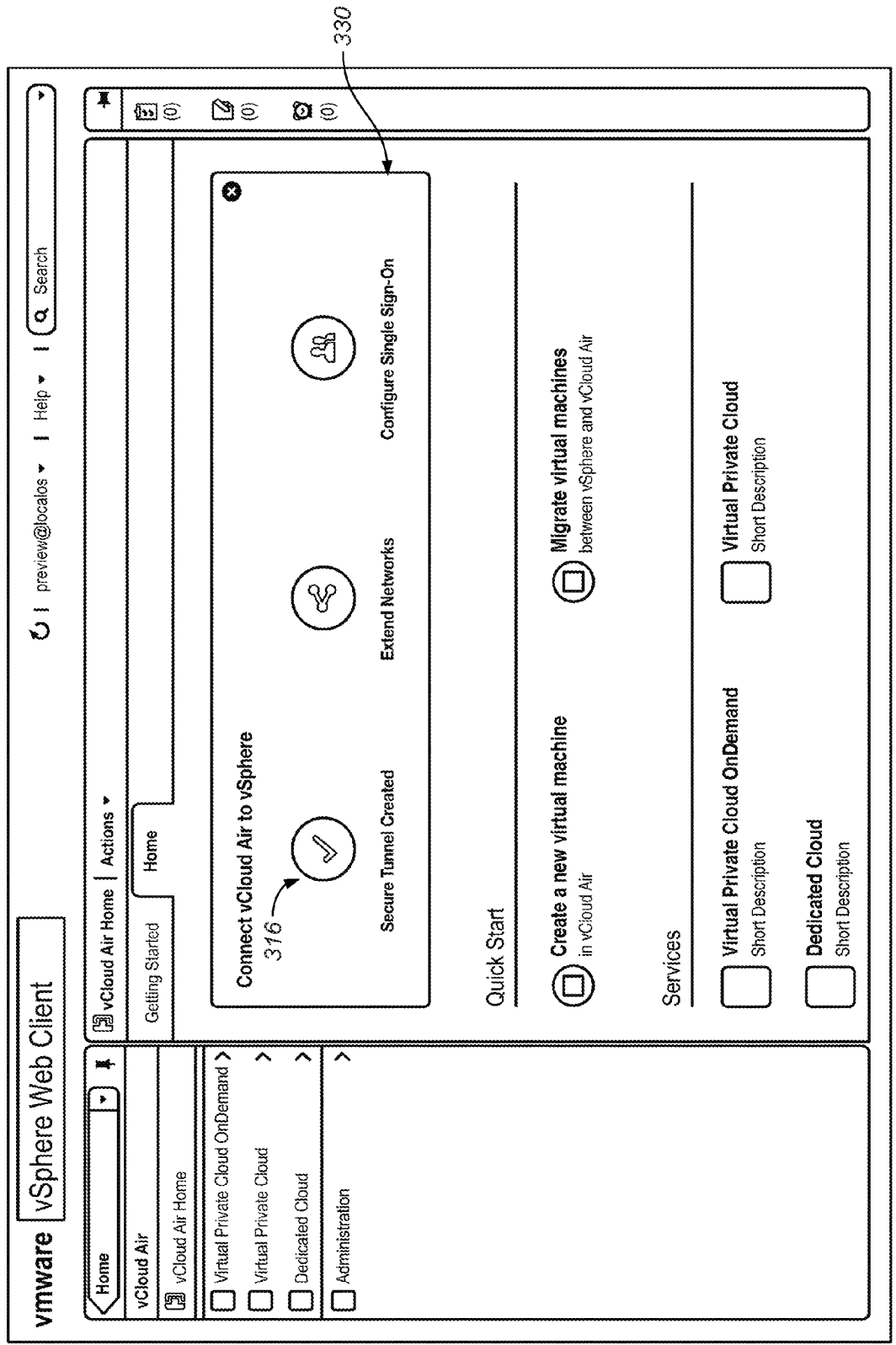

In various embodiments, graphical user interface 300 also provides contextual help information in response to a user interaction. For example, FIG. 3D illustrates view 330 in which a user has hovered the cursor over control 316. Instructional information 324, related to the operation of control 316, is provided in response to the cursor hovering over control 316. It should be appreciated that any type of contextual help information related to the operation of the associated control may be provided.

In one embodiment, receiving a user interaction with control 316 initiates a workflow for creating a secure tunnel. A secure network tunnel (e.g., a secure virtual private tunnel) is established between a first cloud-computing facility (e.g., a local virtualization infrastructure) and a second cloud-computing facility (e.g., a cloud-based virtualization infrastructure). This secure tunnel essentially extends, between two network edge devices, an internal virtual network within the first cloud-computing facility to the second cloud-computing facility. For example, the virtual network is extended by using the secure tunnel to create a secure socket layer virtual private network (SSL VPN).

FIGS. 4A-E illustrates views of an example workflow 400 of the graphical user interface 300 for creating a secure tunnel between the local virtualization infrastructure and the cloud-based virtualization infrastructure, in accordance with various embodiments.

Figure 4A:
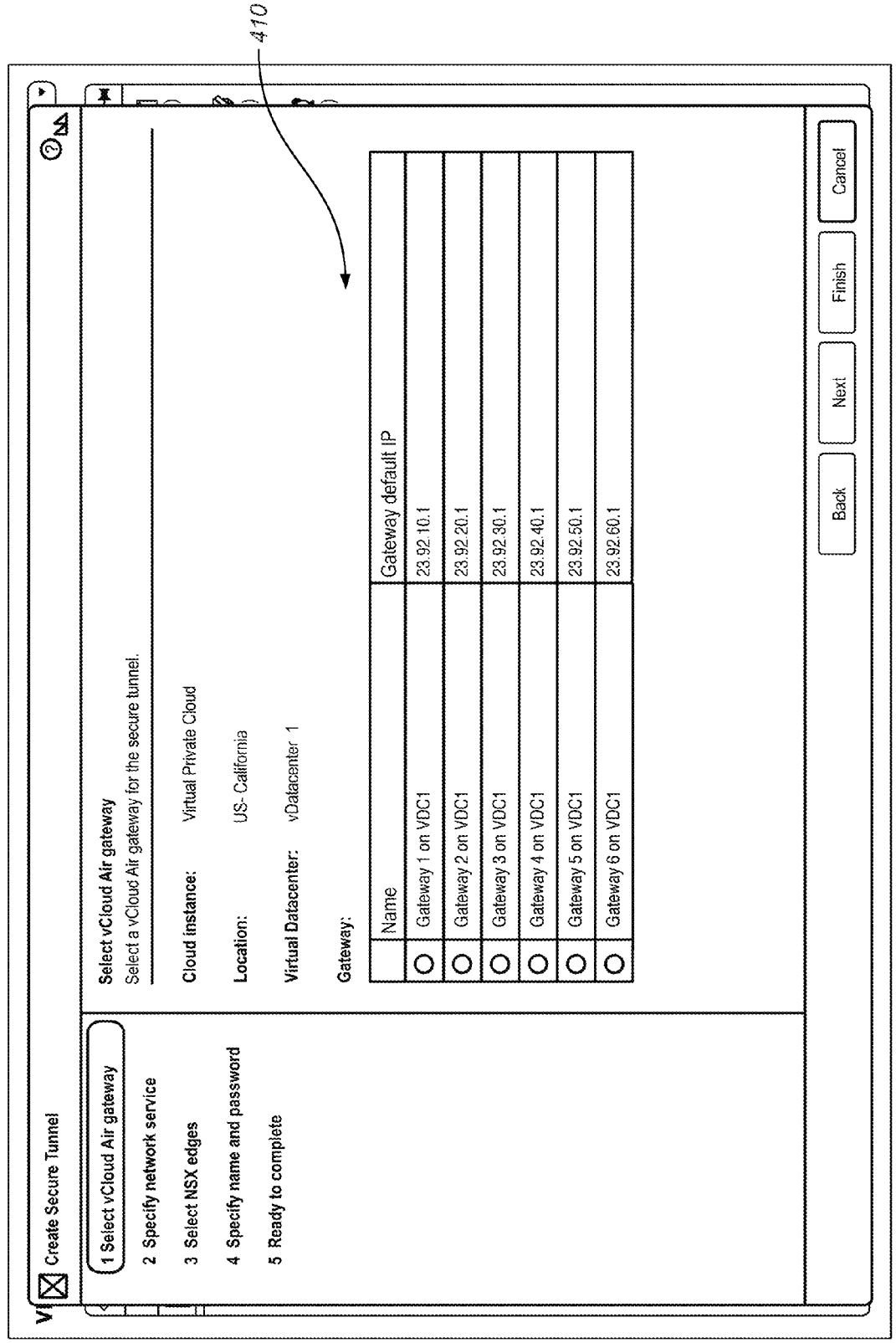
FIGS. 4A-E illustrates views of an example workflow of the graphical user interface for creating a secure tunnel between the local virtualization infrastructure and the cloud-based virtualization infrastructure, in accordance with various embodiments.

FIG. 4A illustrates a view 410 of workflow 400. View 410 is displayed in response to receiving a user interaction with control 316 of view 330. View 410 includes a remote gateway selection interface for receiving a selection of a remote gateway of the cloud-based virtualization infrastructure.

Figure 4B:
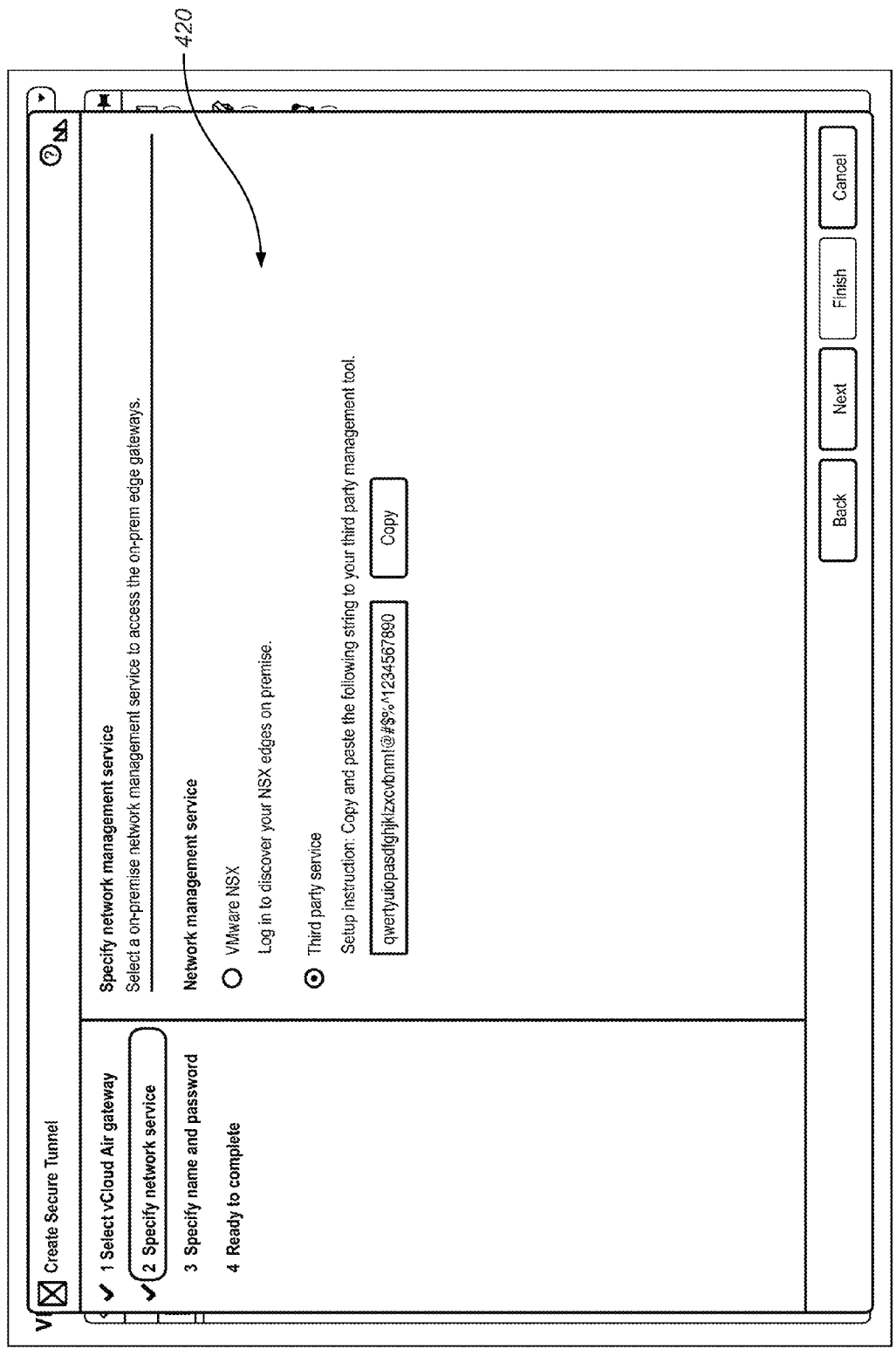

FIG. 4B illustrates a view 420 of workflow 400. View 420 includes a network management services selection interface for receiving a selection of a network management service of the local virtualization infrastructure. For example, an integrated network management service may be selectable (e.g., VMware's NSX), selection of which allows a user to log in to the integrated network management service. In another example, a third party service may also be selectable. In one embodiment, selection of the third party network management service provides a text field for receiving a string provided by the third party network management service.

Figure 4C:
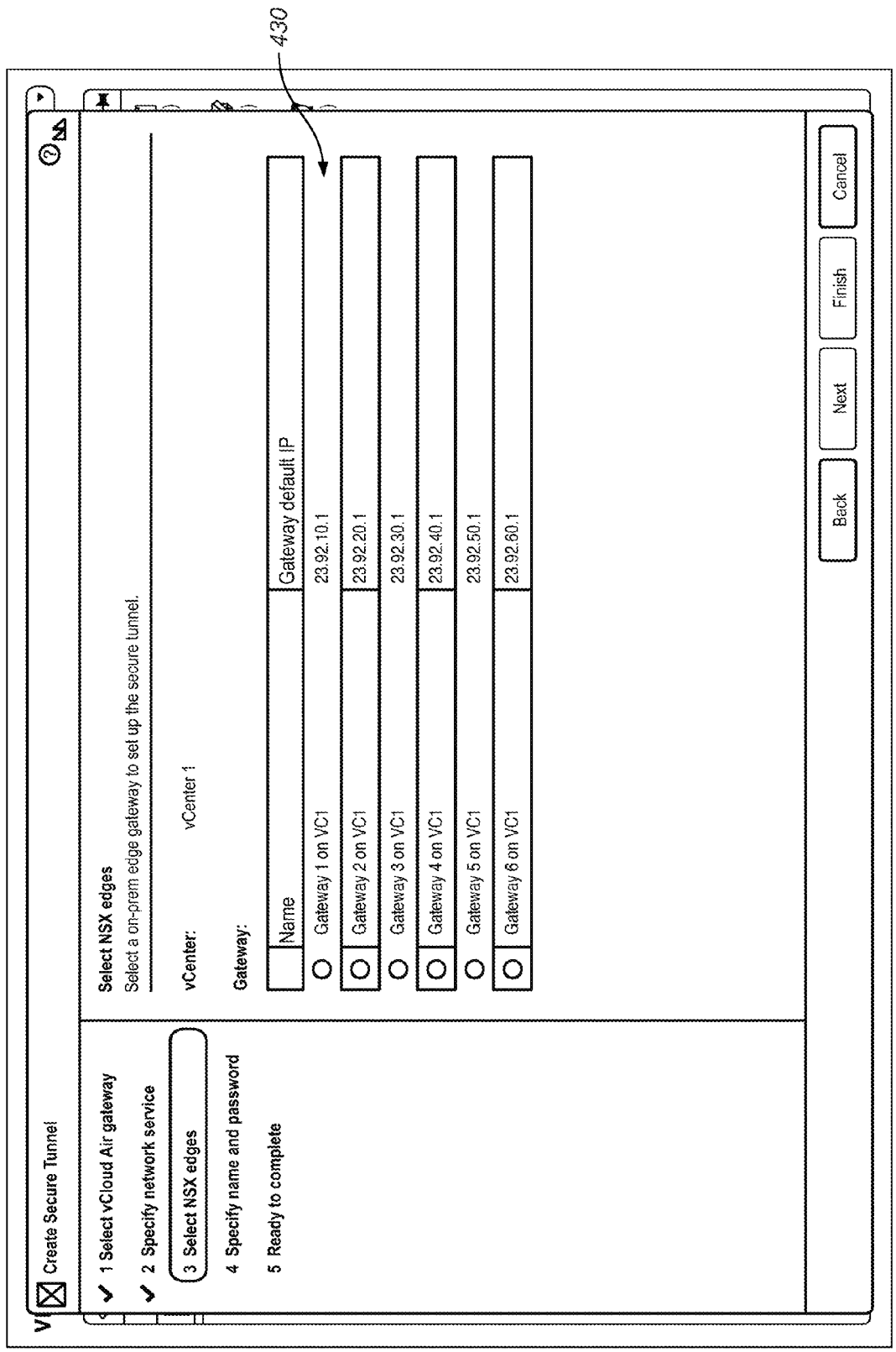

FIG. 4C illustrates a view 430 of workflow 400. View 410 includes a local gateway selection interface for receiving a selection of a local gateway of the local virtualization infrastructure.

Figure 4D:
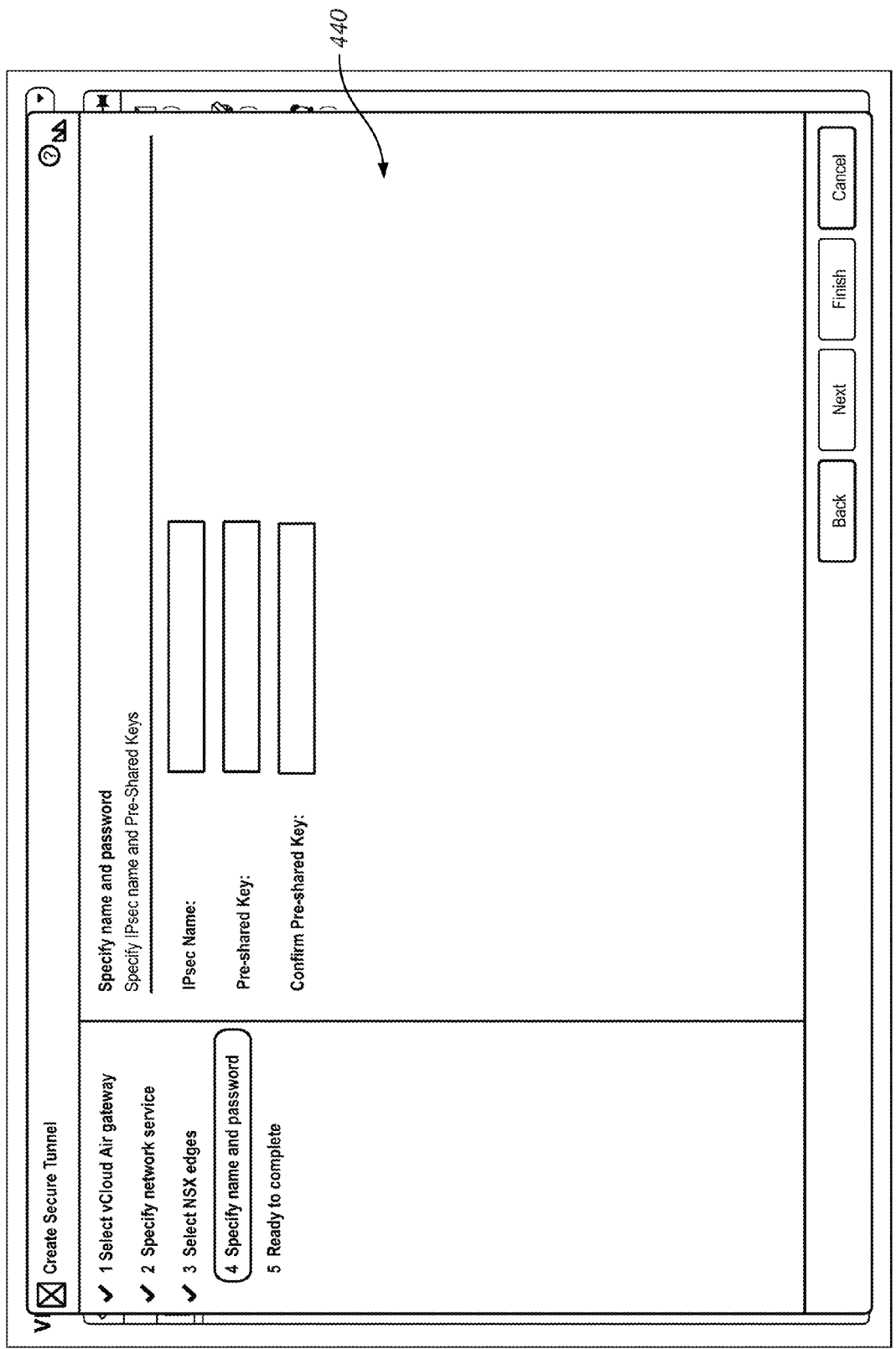

FIG. 4D illustrates a view 440 of workflow 400. View 440 includes a name and password specification interface. In one embodiment, view 440 includes text fields for receiving a username and a password (e.g., a pre-shared key) for establishing the secure tunnel.

Figure 4E:
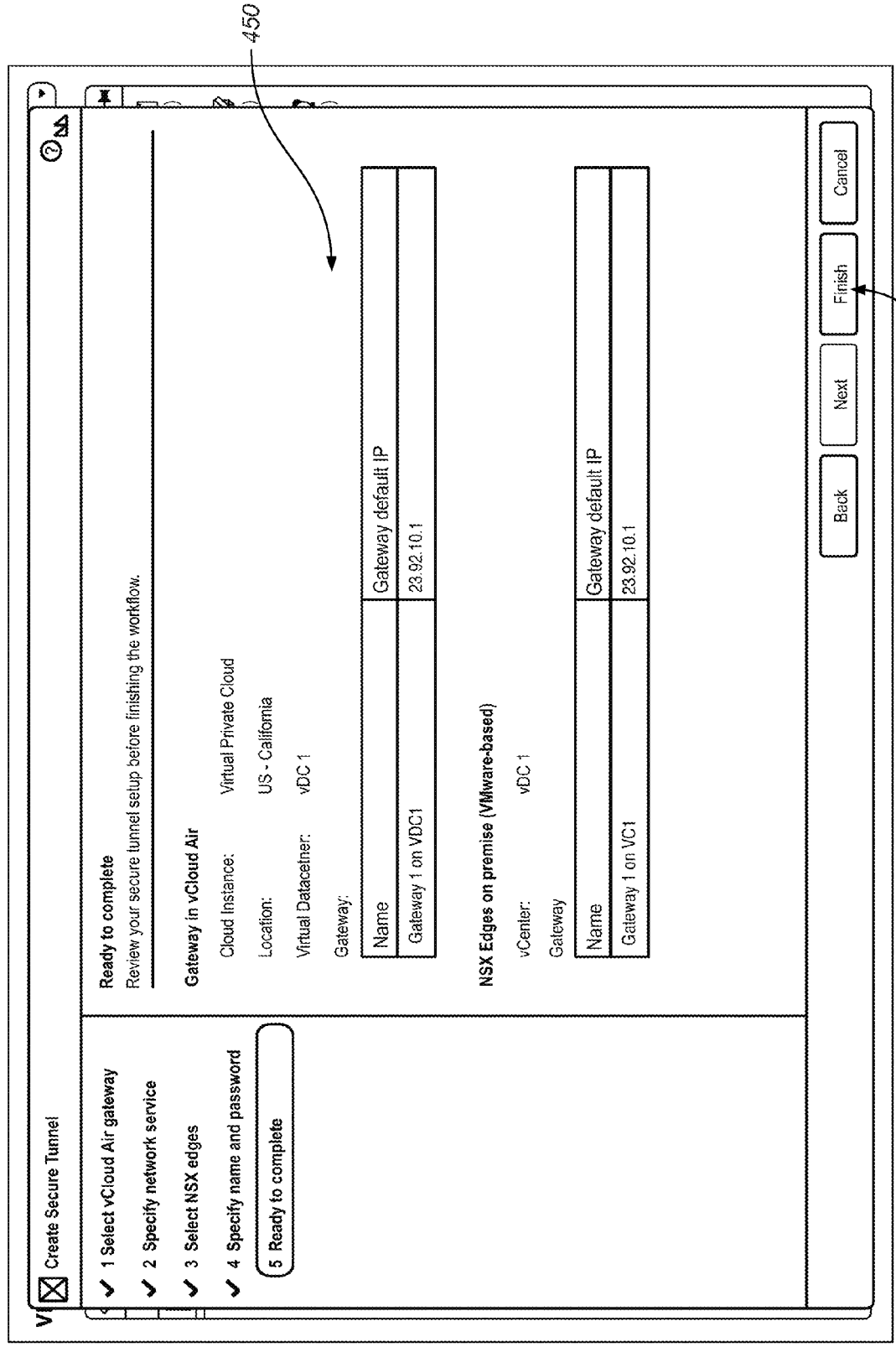

FIG. 4E illustrates a view 450 of workflow 400. View 450 includes a summary of the information selected and/or entered in views 410, 420, 430 and 440. View 450 allows a user to review the configuration of secure tunnel prior to confirmation. View 450 also includes controls for navigating back through workflow 400 and for accepting the configuration presented for establishing the secure tunnel. Responsive to receiving an interaction with control 452, the secure tunnel is generated based at least on the selected remote gateway, the selected network management service, and the selected local gateway.

Figure 5A:
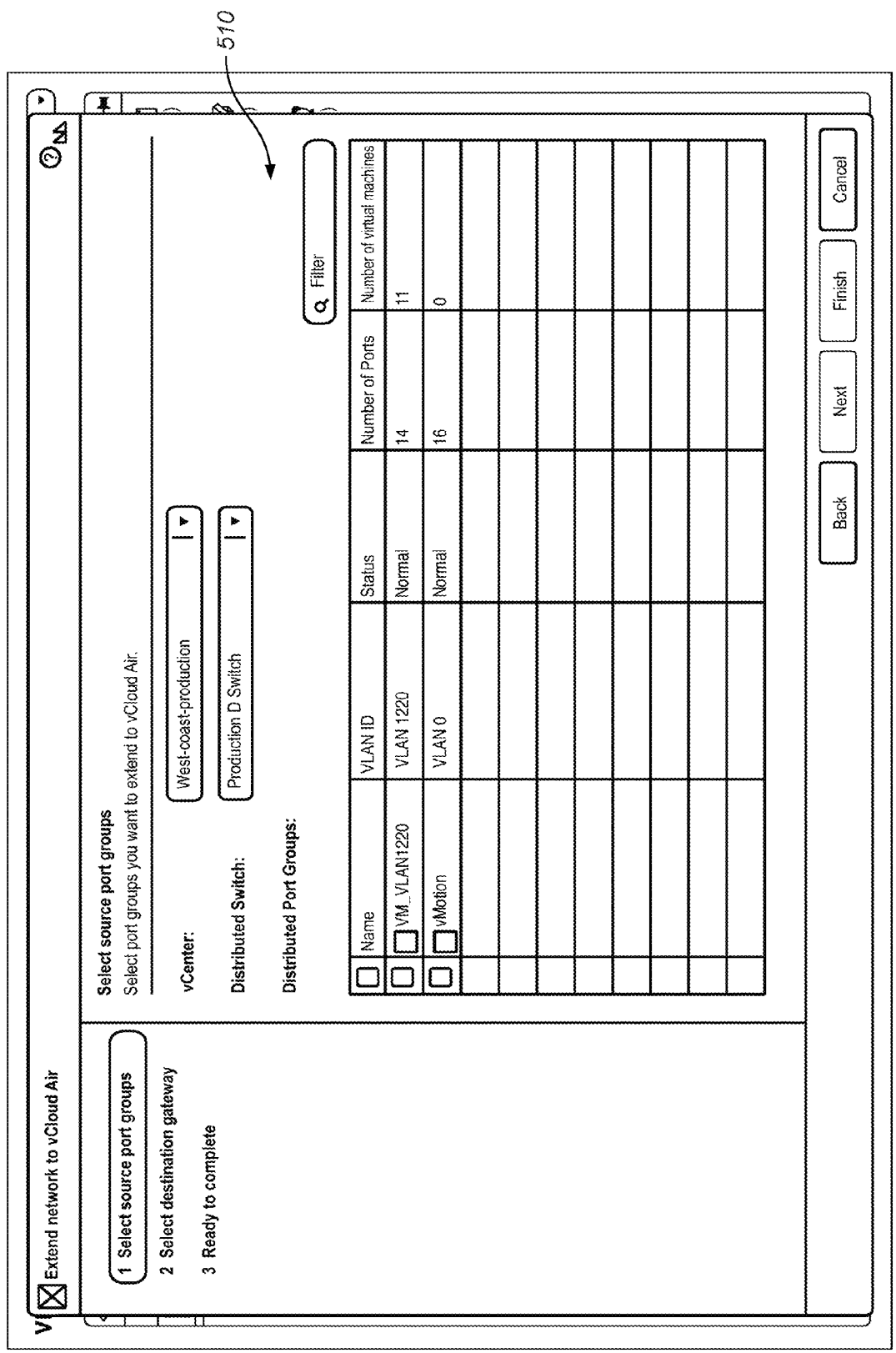
FIGS. 5A-C illustrates views of an example workflow of the graphical user interface for extending a network between the local virtualization infrastructure and the cloud-based virtualization infrastructure, in accordance with various embodiments.
Figure 5B:
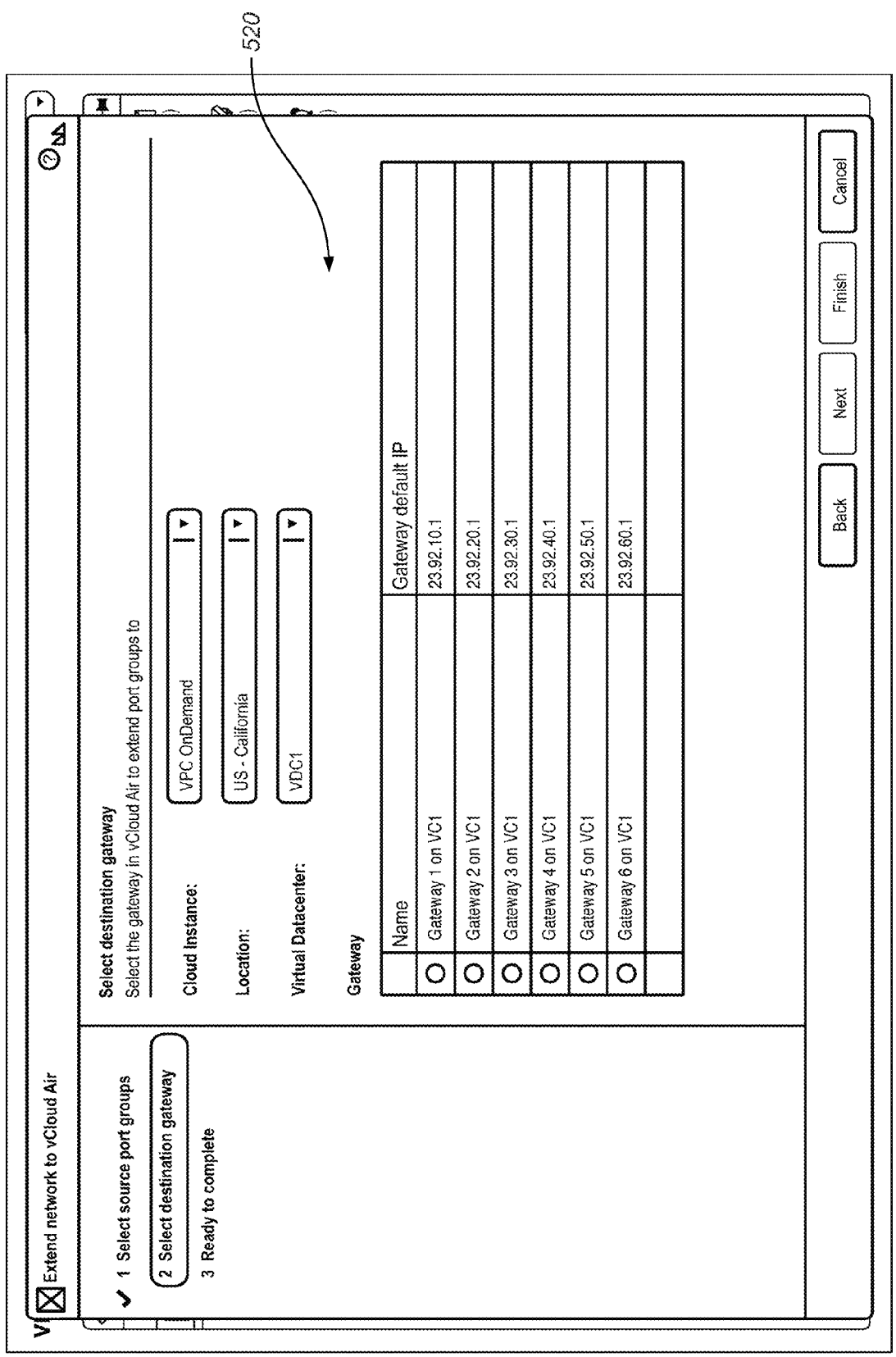
Figure 5C:
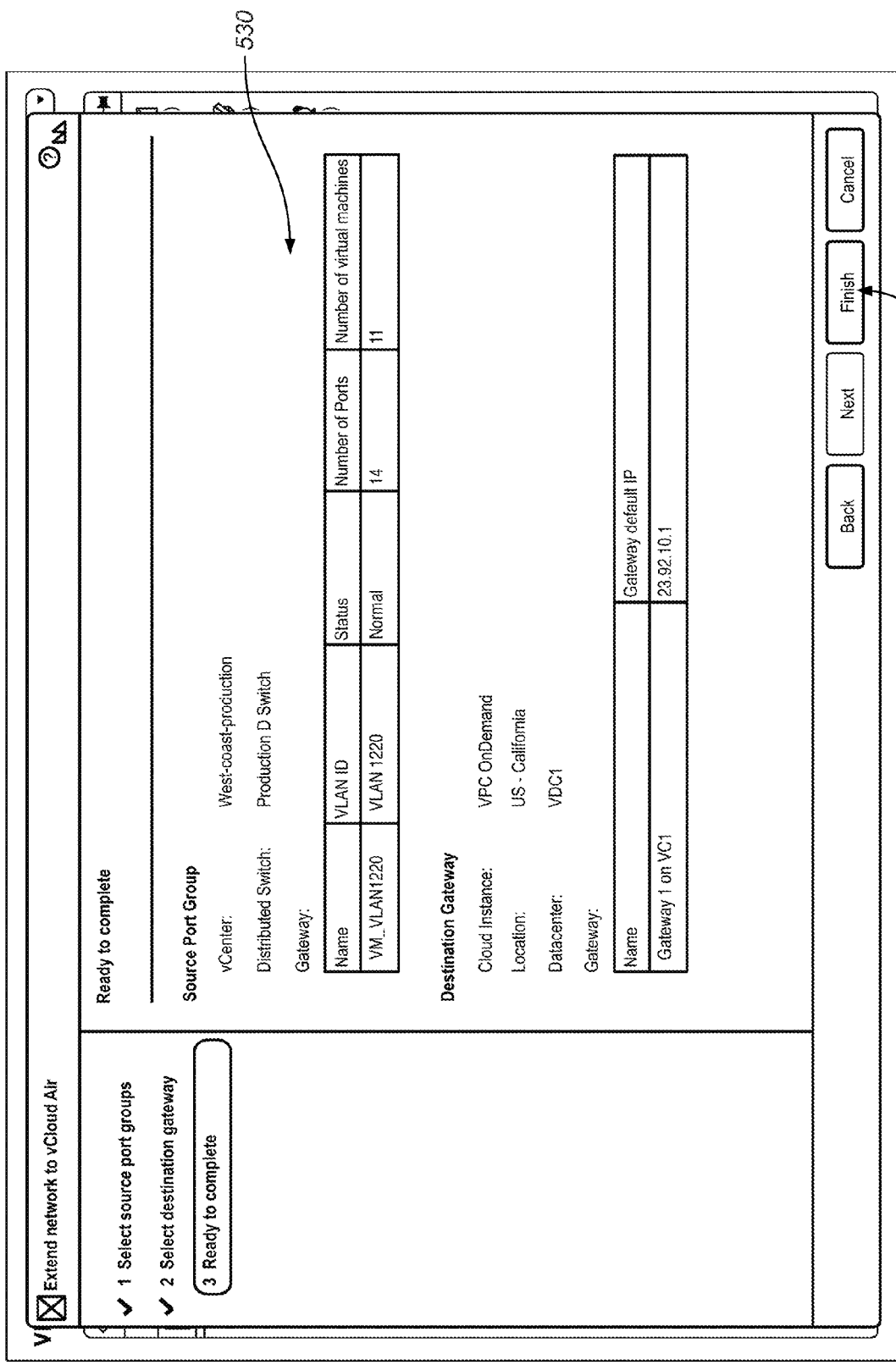

With reference to view 330, in one embodiment, receiving a user interaction with control 318 initiates a workflow for extending the network. FIGS. 5A-C illustrates views of an example workflow 500 of the graphical user interface 300 for extending a network between the local virtualization infrastructure and the cloud-based virtualization infrastructure, in accordance with various embodiments.

FIG. 5A illustrates a view 510 of workflow 500. View 510 is displayed in response to receiving a user interaction with control 318 of view 330. View 510 includes a source port group selection interface for receiving a selection of a port group of the local virtualization infrastructure for extending the local virtualizatian infrastructure to the cloud-based virtualization infrastructure.

FIG. 5B illustrates a view 520 of workflow 500. View 520 includes a destination gateway selection interface for receiving a selection of a destination gateway of the cloud-based virtualization infrastructure to extend a selected port group of the local virtualization infrastructure to the cloud-based virtualization infrastructure.

FIG. 5C illustrates a view 530 of workflow 500. View 530 includes a summary of the information selected and/or entered in views 510 and 520. View 530 allows a user to review the configuration of network extension prior to confirmation. View 530 also includes controls for navigating back through workflow 500 and for accepting the configuration presented for extending the network. Responsive to receiving an interaction with control 532, the selected port group of the local virtualization infrastructure is extended to the cloud-based virtualization infrastructure based at least in part of the selected port group and a selected destination gateway.

Returning to FIG. 3E, FIG. 3E illustrates view 330 of graphical user interface 300 that is displayed in response to completion of the configuration of a secure tunnel between the local virtualization infrastructure and the cloud-based virtualization infrastructure. As illustrated, upon completion of the secure tunnel configuration, the visualization of control 316 changes to reflect the completion. For example, as shown, control 316 illustrates a check mark to indicate completion. It should be appreciated that other visual indicators may be used to indicate the completion. For example, and without limitation, the visualization of control 316 may use a different color or use a text descriptor (such as "completed").

Figure 3F:
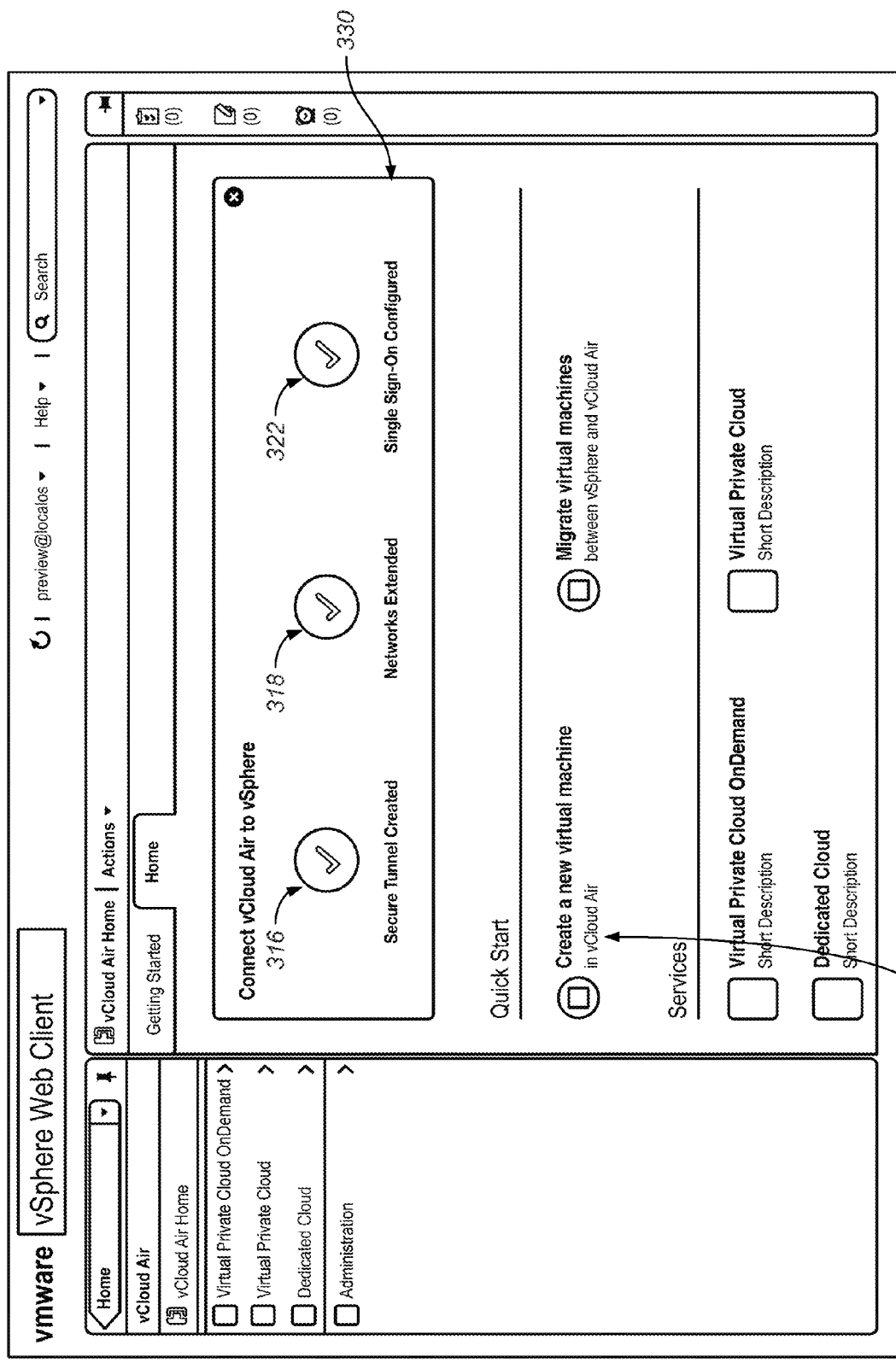

FIG. 3F illustrates a similar view 330 of graphical user interface 300 that is displayed in response to completion of the operations associated with each of controls 316, 318 and 322. As illustrated in FIG. 3F, view 330 includes control 328 for creating a new virtual machine.

Figure 6:
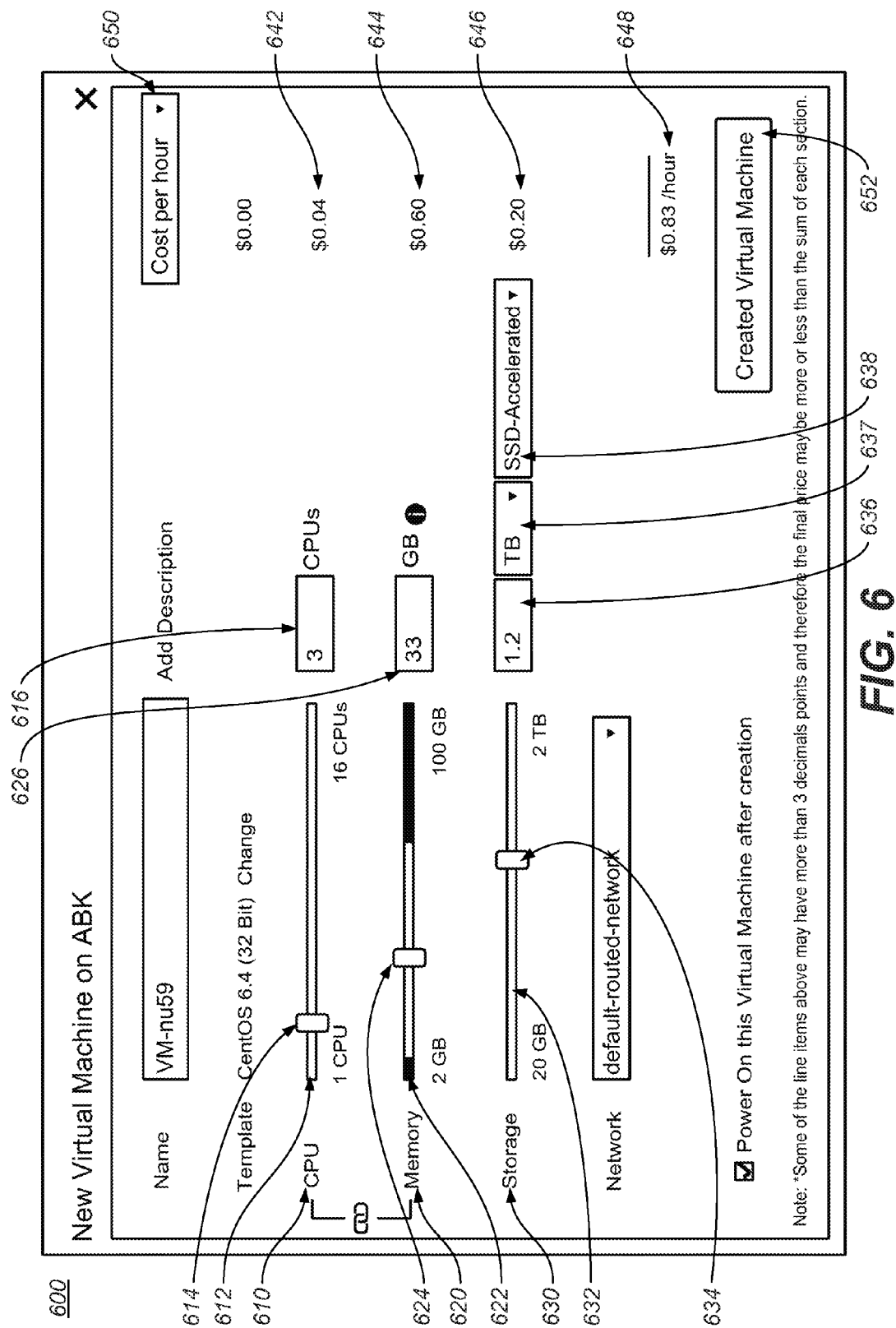
FIG. 6 illustrates a view of an example graphical user interface for creating a virtual machine, in accordance with an embodiment.

FIG. 6 illustrates a view 600 of an example graphical user interface 300 for creating a virtual machine, in accordance with an embodiment. In one embodiment, view 600 is displayed in response to receiving a user interaction with control 328 of FIG. 3F. In facilitating the creation of a virtual machine, view 600 is displayed that provides for user configuration of various parameters of the virtual machine. For example, view 600 may present selectable parameters including CPU capacity and memory capacity for the virtual machine. View 600 may also present other selectable parameters, such as storage capacity, as well as projected costs for various selections. FIG. 6 shows an example view of a view 600, in accordance with various embodiments. View 600 provides for the creation and configuration of a new virtual machine by providing selectable parameters, including CPU capacity 610, memory capacity 620, and storage capacity 630.

CPU capacity 610 is selectable responsive to receiving an interaction with slider 612, either directly or via indicator 614. In various embodiments, GUI 600 also includes first alphanumeric text field 616 associated with CPU capacity 610. In one embodiment, the selection indicated by indicator 614 is reflected in first alphanumeric text field 616 (e.g., as shown indicator 614 corresponds to 3 CPUs, as indicated in first alphanumeric text field 616. In another embodiment, an input received at first alphanumeric text field 616 is reflected by indicator 614. For example, as shown, an input of 3 CPUs is received at first alphanumeric text field 616, and indicator 614 is positioned to reflect 3 CPUs on slider 612. It should be appreciated that in accordance with various embodiments, a selection can be made at either slider 612 or first alphanumeric text field 616, such that the selection at one location is reflected in the other location. As illustrated, CPU capacity 610 is selectable within the range of 1 CPU to 16 CPUs. However, it should be appreciated that CPU capacity 610 may be configured to allow for any range of selection, and is not limited to the illustrated embodiment.

Memory capacity 620 is selectable responsive to receiving an interaction with slider 622, either directly or via indicator 624. In various embodiments, GUI 600 also includes second alphanumeric text field 626 associated with memory capacity 620. In one embodiment, the selection indicated by indicator 624 is reflected in second alphanumeric text field 626 (e.g., as shown indicator 624 corresponds to 33 gigabytes (GB), as indicated in second alphanumeric text field 626. In another embodiment, an input received at second alphanumeric text field 626 is reflected by indicator 624. For example, as shown, an input of 33 GB is received at second alphanumeric text field 626, and indicator 624 is positioned to reflect 33 GB on slider 622. It should be appreciated that in accordance with various embodiments, a selection can be made at either slider 622 or second alphanumeric text field 626, such that the selection at one location is reflected in the other location. As illustrated, memory capacity 620 is selectable within the range of 2 GB to 100 GB. However, it should be appreciated that memory capacity 620 may be configured to allow for any range of selection, and is not limited to the illustrated embodiment.

In various embodiments, GUI 600 also includes cost indicator 642 corresponding to CPU capacity 610, cost indicator 644 corresponding to memory capacity 620, cost indicator 646 corresponding to storage capacity 630, and total cost indicator 648. Costs indicators 642, 644, 646 and total cost indicator 648 provide the projected cost of the associated selection of a parameter, and dynamically update based on the selection of the corresponding parameter. In one embodiment, drop-down menu 650 is selectable to change the time period of calculating the cost values (e.g., cost per hour, cost per day, or cost per month). It should be appreciated that the calculations associated with projected costs are predefined, and that the projected costs are presented to assist in decision-making behind the selection of parameters for creating a virtual machine. Moreover, it should be appreciated that the calculations for determining the cost may be changed at an administrator level.

With reference to FIG. 6, storage capacity 630 is selectable responsive to receiving an interaction with slider 632, either directly or via indicator 634. In various embodiments, GUI 600 also includes third alphanumeric text field 636 associated with storage capacity 630. In one embodiment, the selection indicated by indicator 634 is reflected in third alphanumeric text field 636 (e.g., as shown indicator 614 corresponds to 20 gigabytes (GB), as indicated in third alphanumeric text field 636. In one embodiment, drop-down menu 637 is selectable for providing different storage sizes for selection (e.g., megabytes (MB), GB, and terabytes (TB)).

In one embodiment, GUI 600 includes button 652 for creating a virtual machine. For example, user selections of CPU capacity 610, memory capacity 620, and storage capacity 630 are received, as well as storage type selected via drop-down menu 638. A selection of button 652 is received, resulting in the creation of a new virtual machine.

Figure 3G:
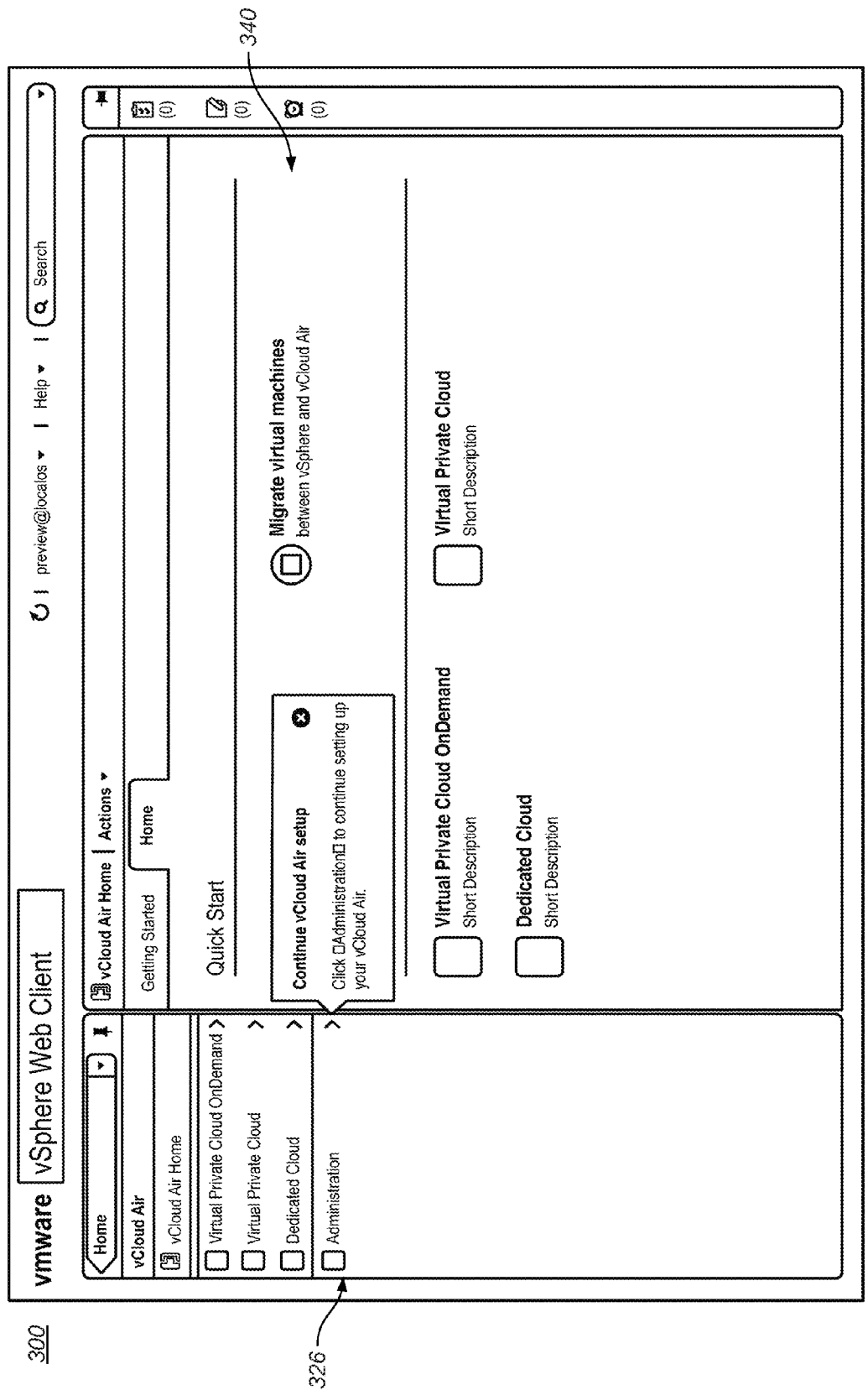

With reference to FIG. 3G, FIG. 3G illustrates view 340 of graphical user interface 300 that is displayed in response to completion of the operations associated with connecting the local virtualization infrastructure to the cloud-based virtualization infrastructure. View 340 is similar to view 330, with controls 316, 318 and 322 being removed as the connection between the local virtualization infrastructure and the cloud-based virtualization infrastructure has been established. Pane 326 of view 340 provides controls for allowing a user to access different portions of the overall virtualization infrastructure. For example, controls within pane 326 allow user to access the local virtualization infrastructure, the cloud-based virtualization infrastructure, to add to the cloud-based virtualization infrastructure, and to configure the cloud-based virtualization infrastructure.

Example Graphical User Interface and Workflows for Migrating a Virtual Machine Between a Local Virtualization Infrastructure and a Cloud-Based Virtualization Infrastructure Example embodiments described herein provide a method for migrating a virtual machine between a local virtualization infrastructure to a cloud-based virtualization infrastructure using a graphical user interface, FIGS. 7A-K illustrates views of an example graphical user interface 700 for migrating a virtual machine between a local virtualization infrastructure and a cloud-based virtualization infrastructure, in accordance with various embodiments. It should be appreciated that graphical user interface 700 is associated with a local virtualization infrastructure (e.g., on-premises virtualization infrastructure), and is used to effectively extend the local virtualization infrastructure by connecting to a cloud-based virtualization infrastructure (e.g., off-premises virtualization infrastructure).

Figure 7A:
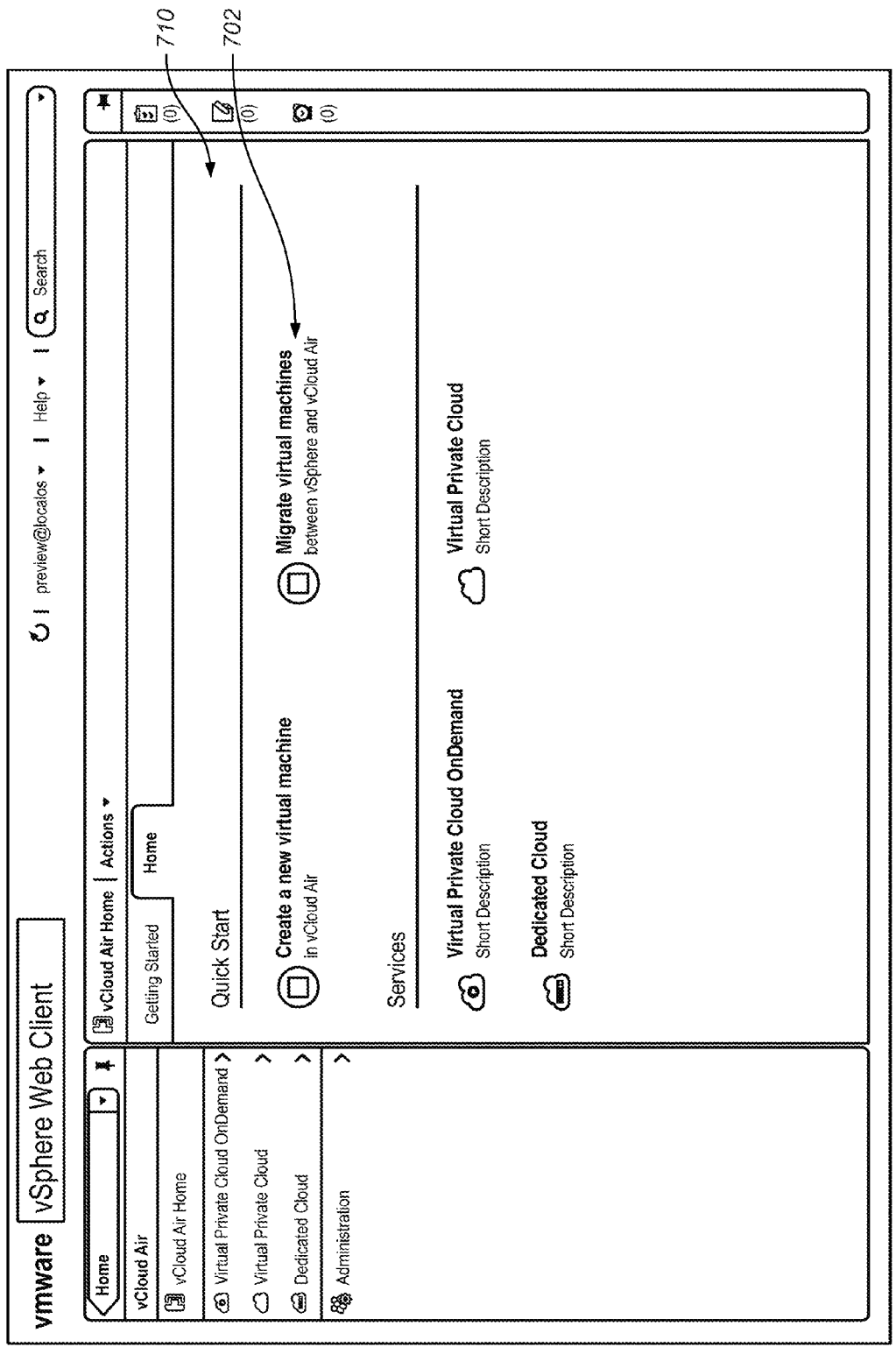

FIG. 7A illustrates a view 710 of an example of graphical using interface 300. View 710 is displayed in response to receiving a user access to a cloud-based virtualization infrastructure service management plugin through graphical user interface 300. For example, as illustrated, graphical user interface 300 is associated with the VMware's vSphere Web Client for managing a local virtualization infrastructure. View 710 provides access to a plugin (e.g., VMware's vCloud Air vSphere Client Plug-in as illustrated) for connecting a local virtualization infrastructure to a cloud-based virtualization infrastructure, FIG. 7A is similar to FIG. 3F as described above. As illustrated in FIG. 7A, view 710 includes control 702 for creating a new virtual machine. In one embodiment, receiving an interaction with control 702 initiates a workflow 700 of graphical user interface 300 for effectuating a migration of the virtual machine between the local virtualization infrastructure and the cloud-based virtualization infrastructure.

Figure 7B:
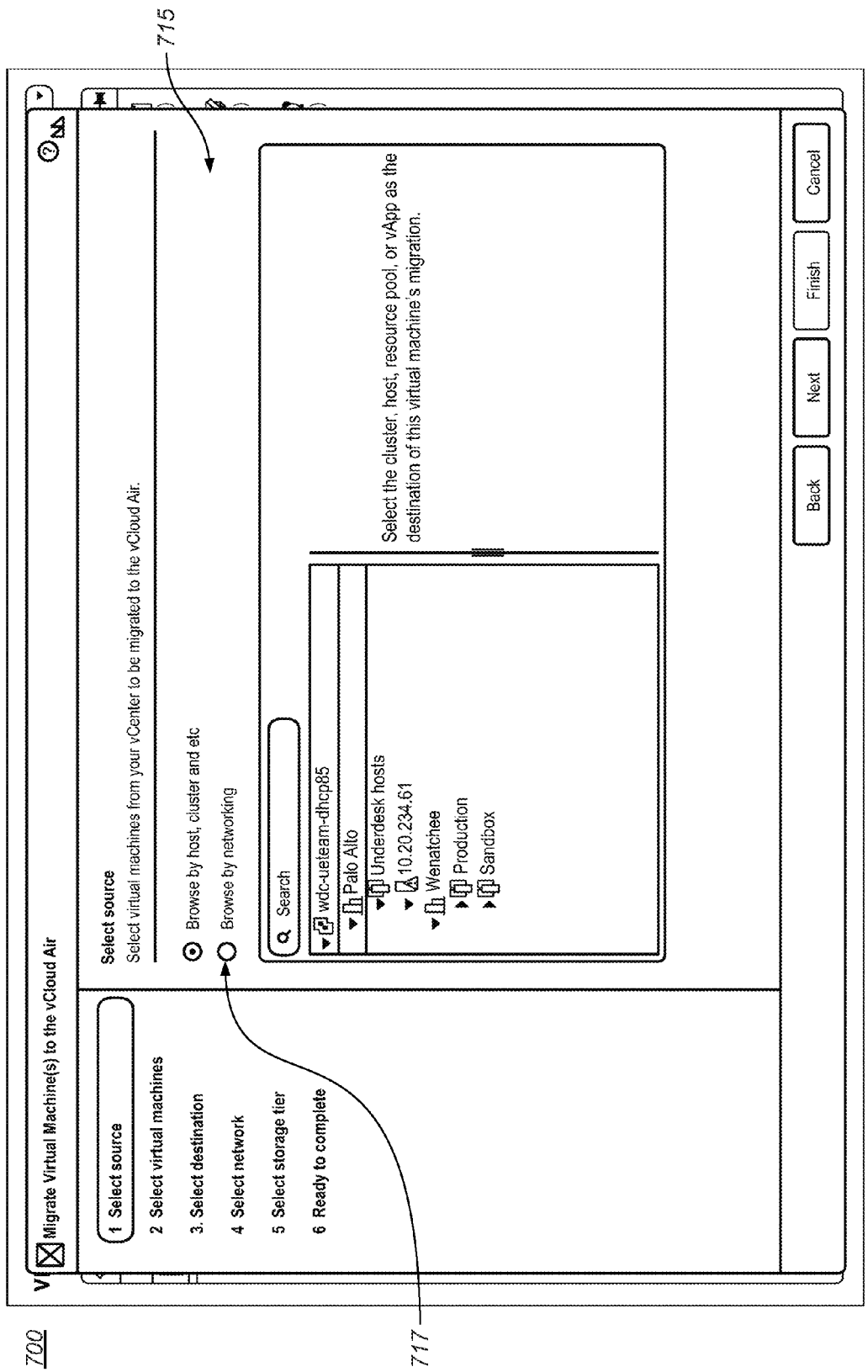
Figure 7C:
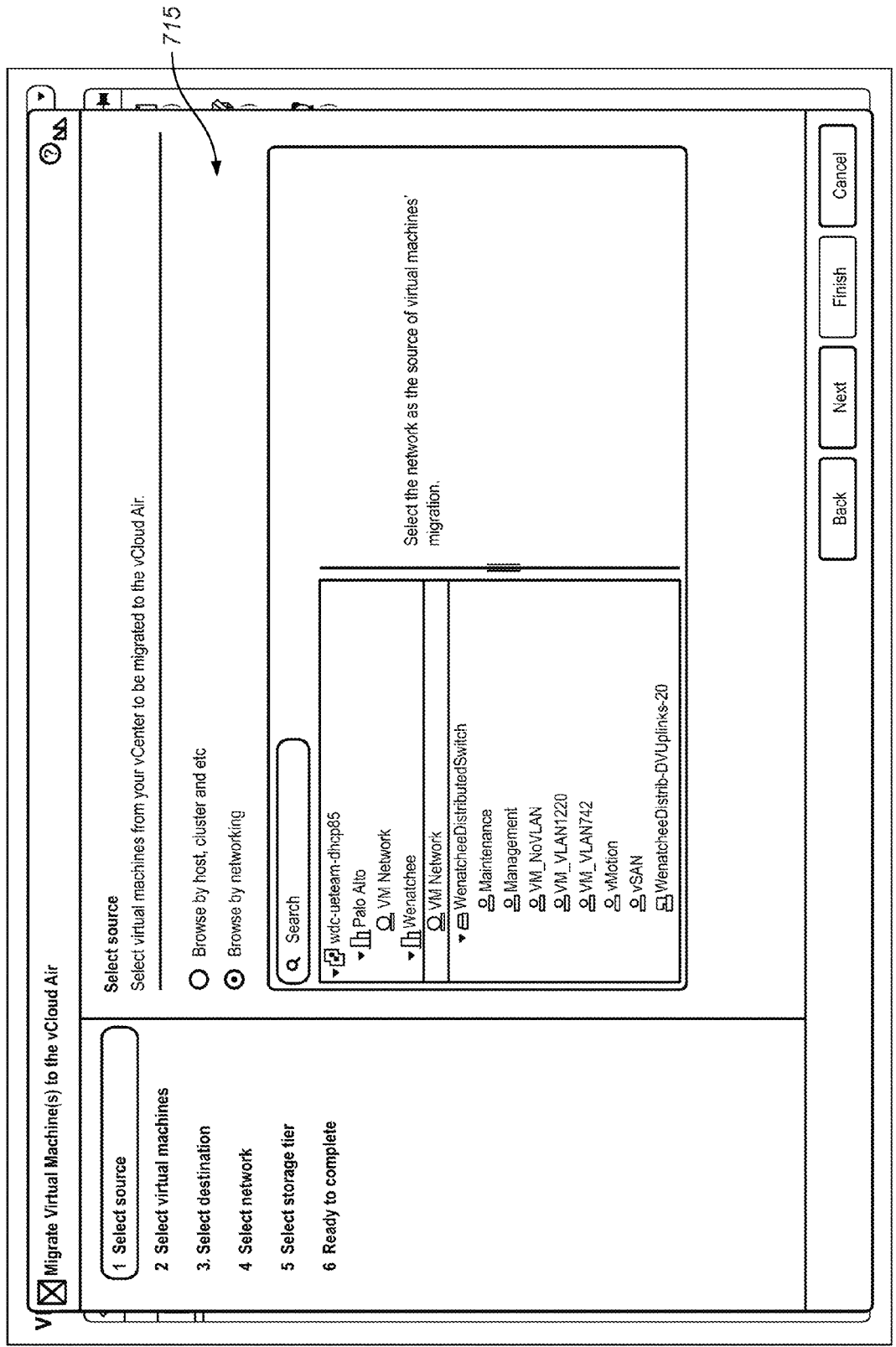

FIG. 7B illustrates a view 715 of workflow 700 for migrating a virtual machine between the local virtualization infrastructure and the cloud-based virtualization infrastructure, in accordance with an embodiment. In one embodiment, view 715 is displayed in response to receiving a user interaction with control 328 of FIG. 3F. View 715 is a source selection view for receiving a selection of a source of the migration. View 715 includes a source selection control 717 for allowing a user to select between browsing by physical component and browsing by network. In one embodiment, as shown in FIG. 7B, responsive to receiving a selection of browsing by physical component, view 715 enables browsing by physical component. In another embodiment, as shown in FIG. 7C, responsive to receiving a selection of browsing by network, view 715 enables browsing by network within the source selection view.

Figure 7D:
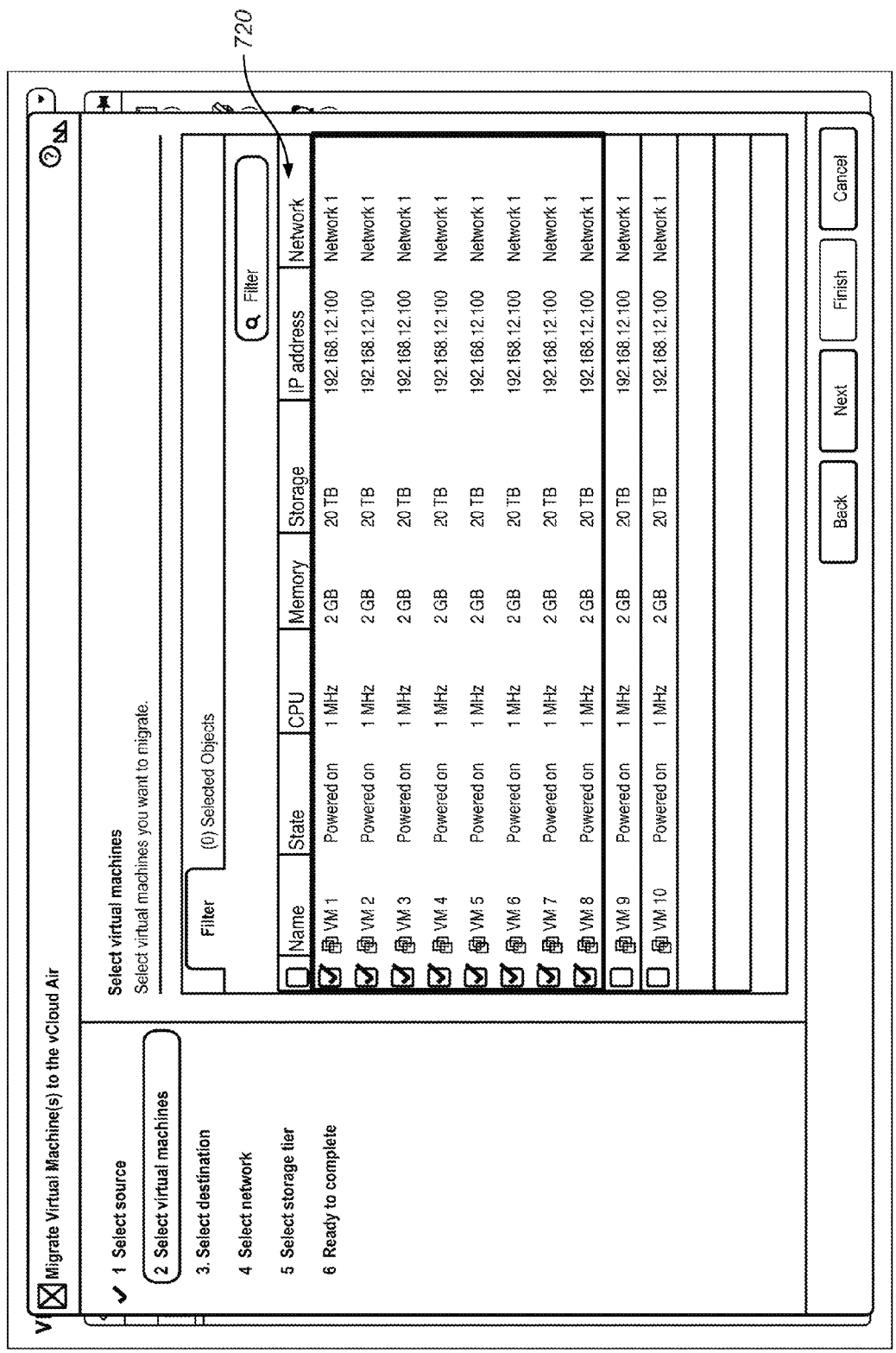

FIG. 7D illustrates view 720 of workflow 700 that is displayed in response to a user selection of a source of the migration. View 720 is a virtual machine selection view for receiving a selection of a virtual machine (or virtual machines) to migrate.

Figure 7E:
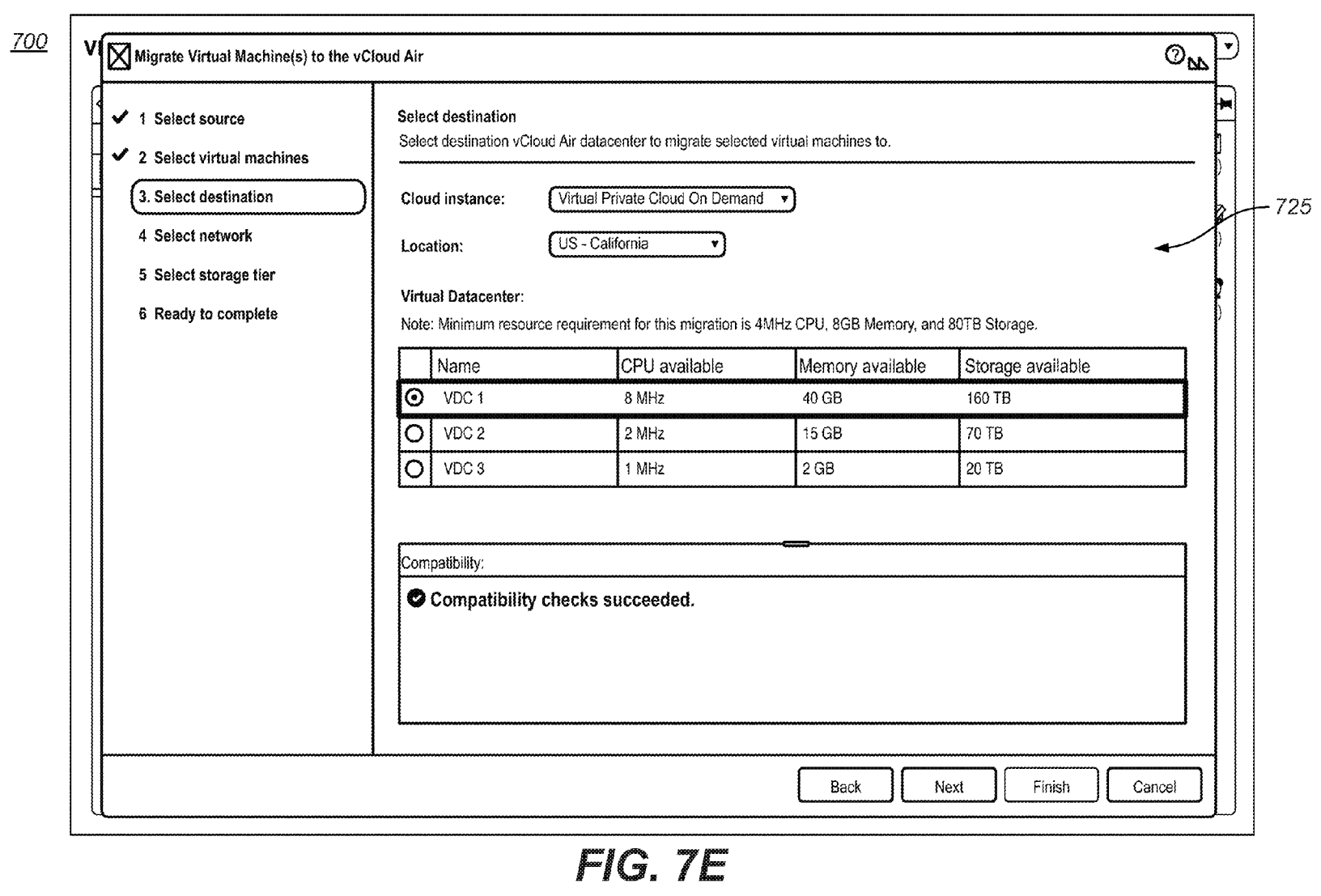

FIG. 7E illustrates view 725 of workflow 700 that is displayed in response to a user selection of at least one virtual machine to migrate. View 725 is a destination selection view for receiving a selection of a destination of the migration. While the described embodiments provide that the source is within the local virtualization infrastructure and the destination is within the cloud-based virtualization infrastructure, it should be appreciated that other embodiments are possible. For example, in other embodiments the source is within the cloud-based virtualization infrastructure and the destination is within the local virtualization infrastructure, or both the source and the destination are within different networks of the cloud-based virtualization infrastructure.

Figure 7F:
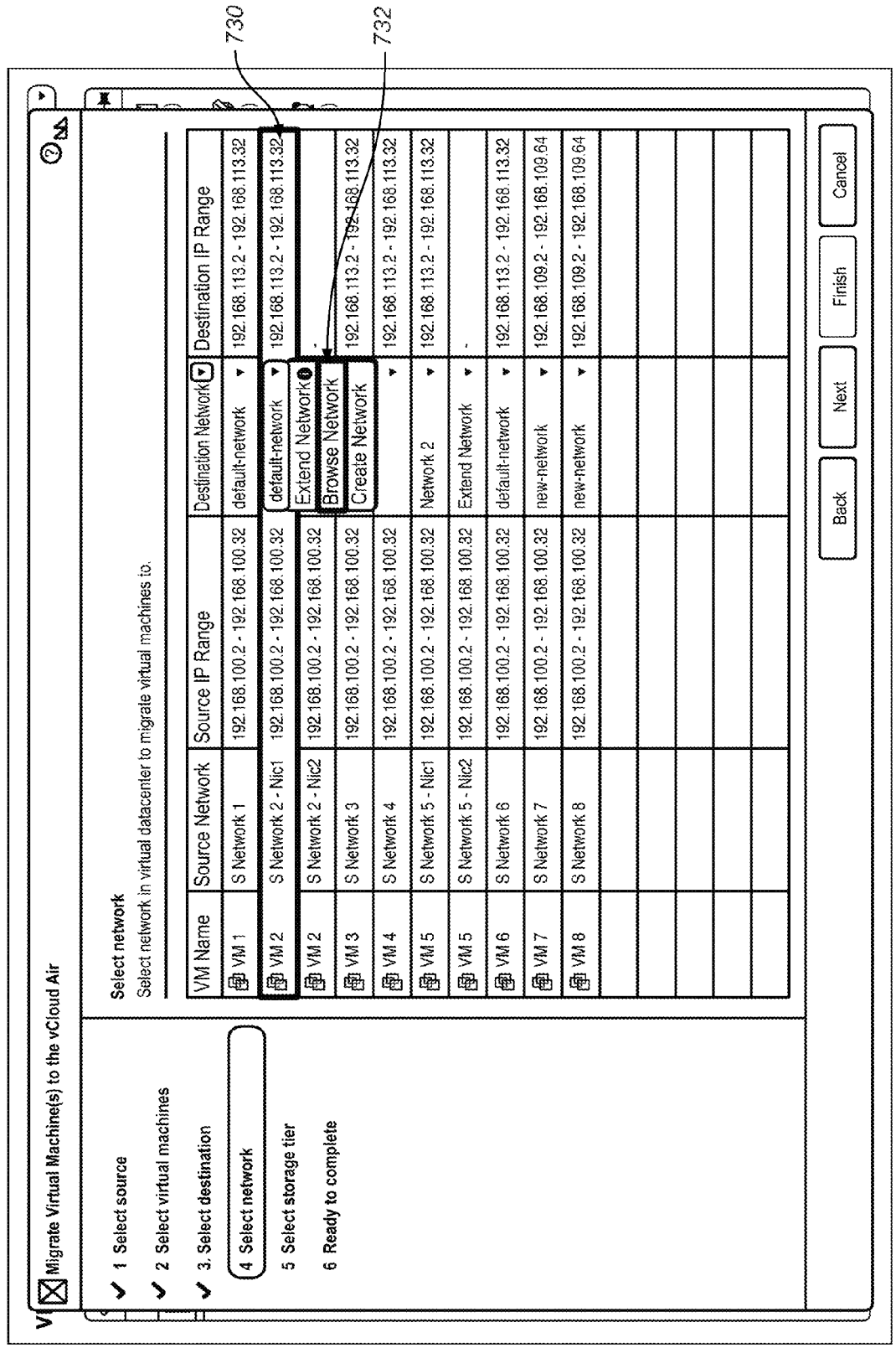

FIG. 7F illustrates view 730 of workflow 700 that is displayed in response to a user selection of a destination of the migration. View 730 is a network selection view for receiving a selection of network of the destination to migrate the virtual machine. In various embodiments, the destination network can be selected from a default network, an extended network (e.g., extending the source network), a new network, or a selected network by browsing available networks. In one embodiment, as shown in view 730, drop-down menu 732 is provided for selecting a destination network. However, it should be appreciated that other selection controls may be implemented.

Figure 7G:
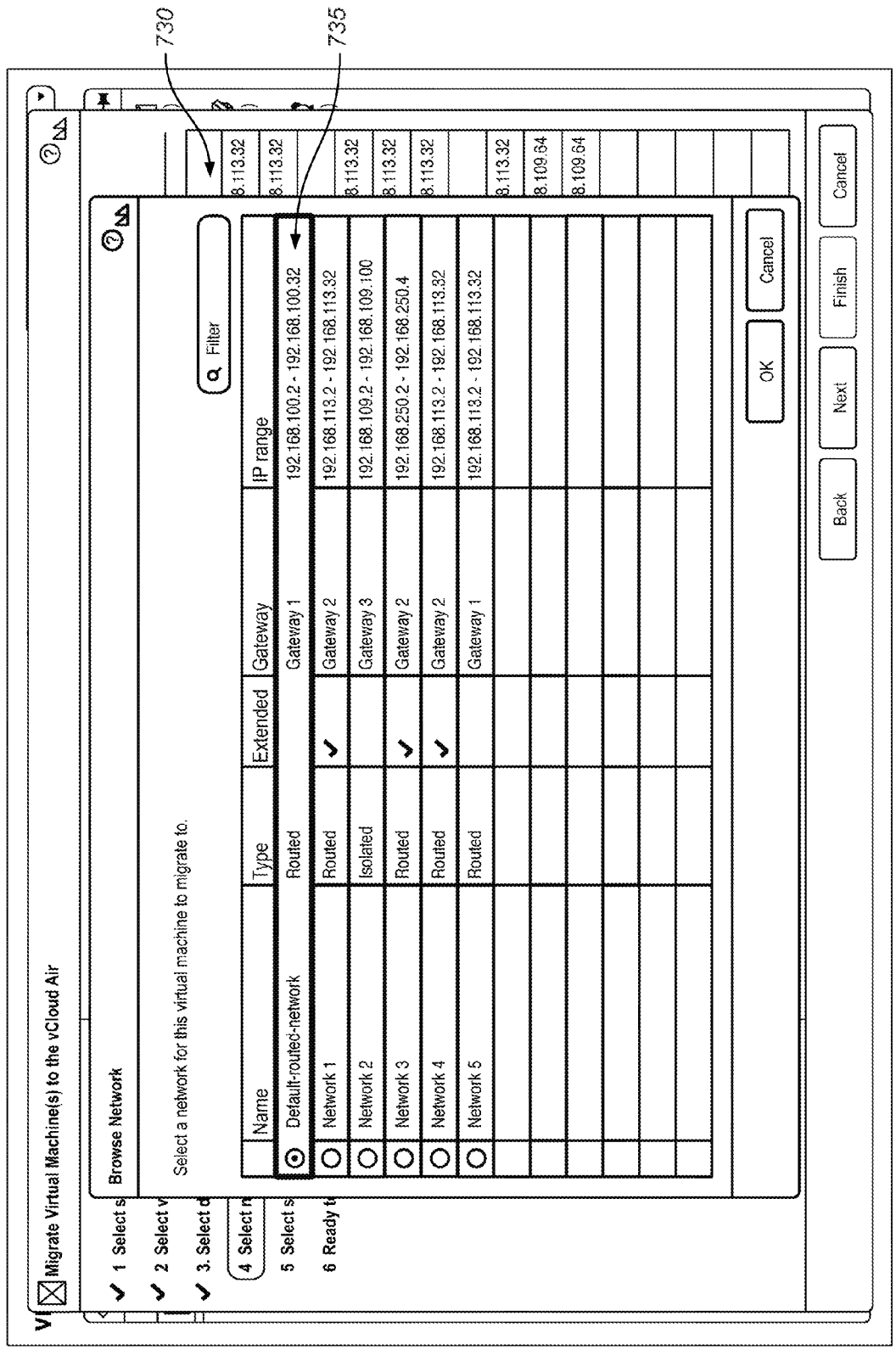
Figure 7H:
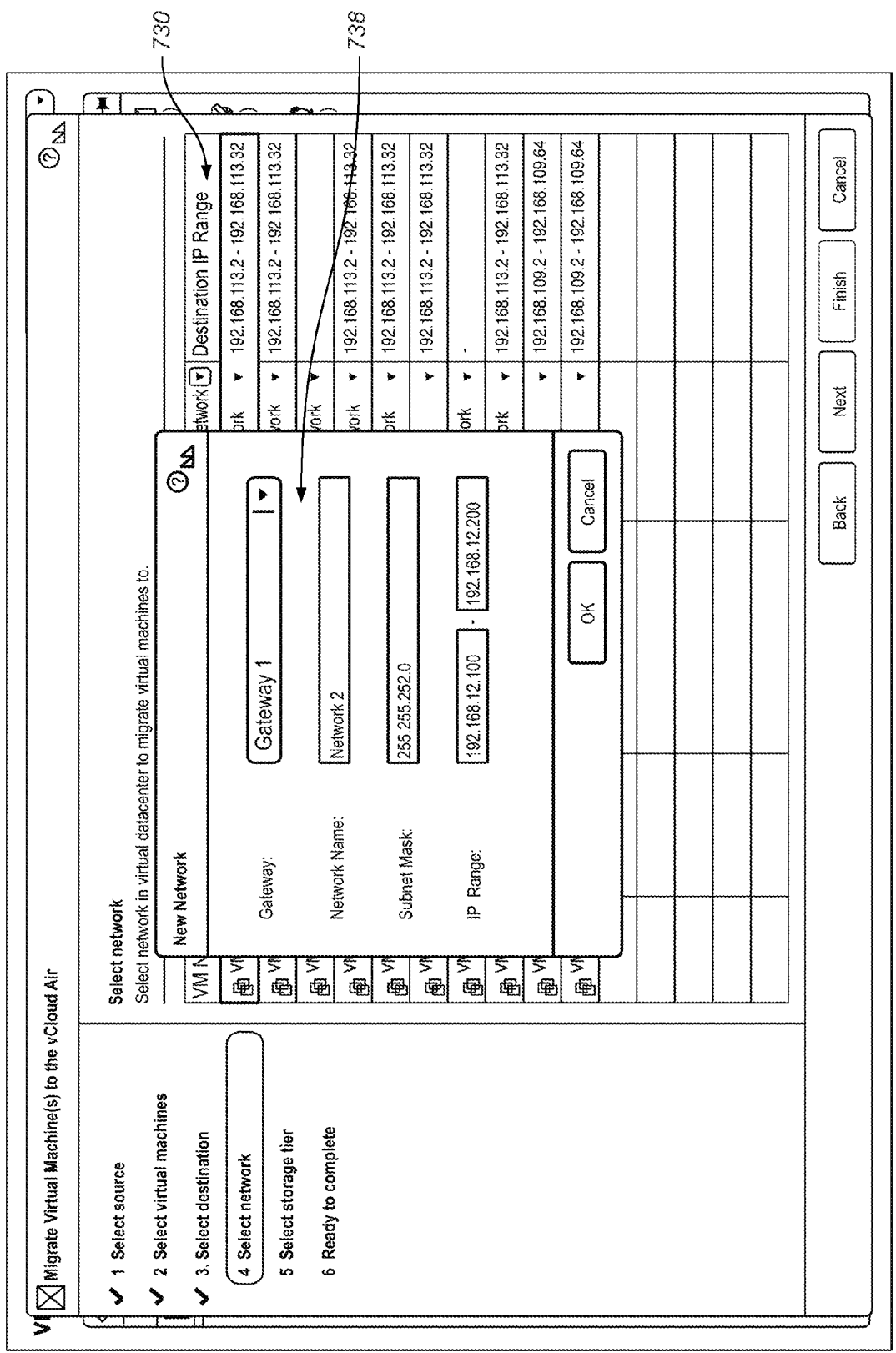

In one embodiment, in response to receiving a selection to browse available networks, as shown in FIG. 7G, pop-up window 735 is displayed, allowing a user to browse available networks. In another embodiment, in response to receiving a selection to create a new network, as shown in FIG. 7H, pop-up window 738 is displayed, allowing a user to browse available networks.

Figure 7I:
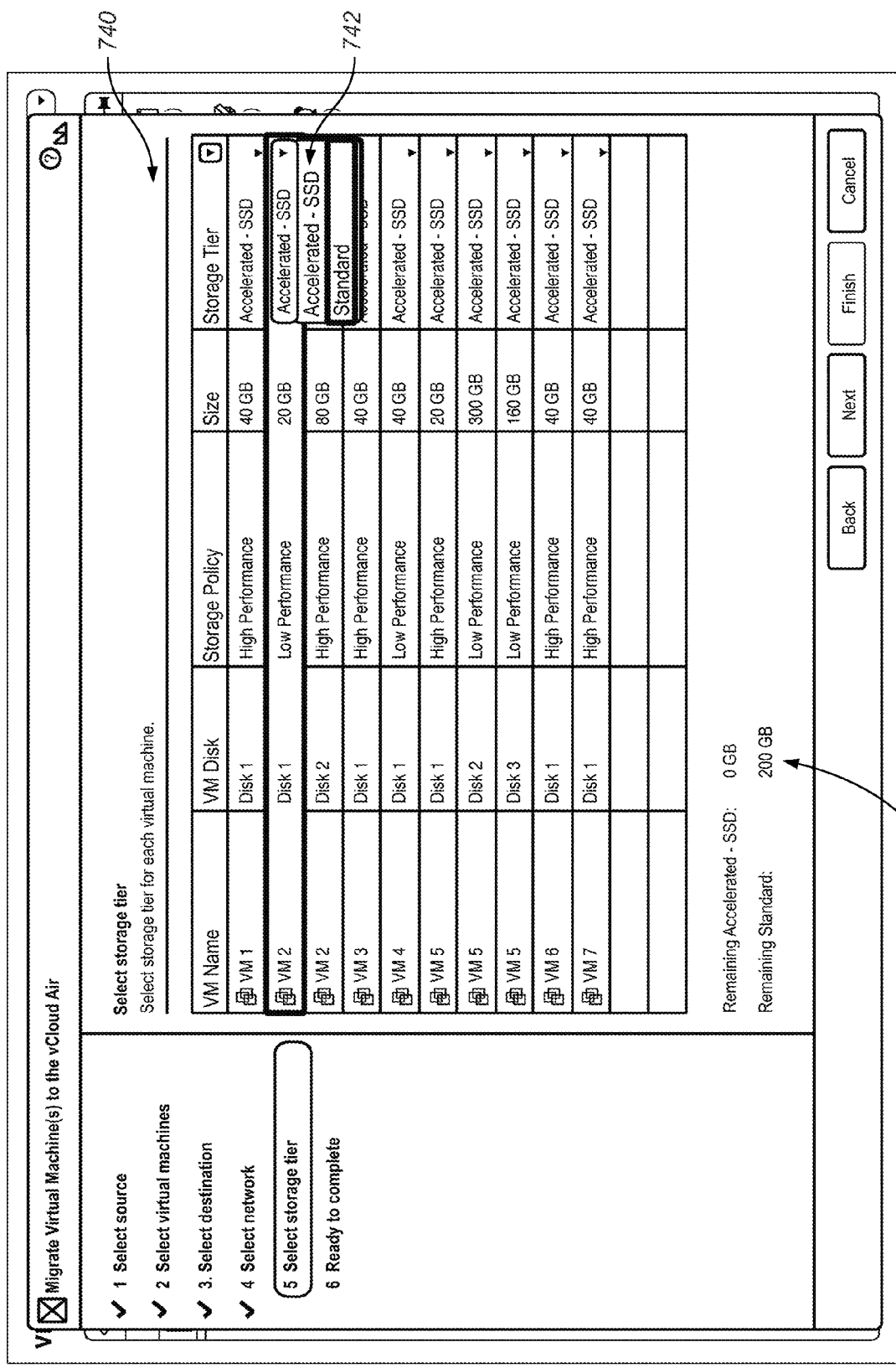

In one embodiment, as shown in FIG. 7I, workflow 700 includes view 740. View 740 is a storage tier selection view for receiving a selection of a storage tier for the virtual machine. For example, as shown, drop-down menu 742 is provided for enabling selection between standard storage and accelerated solid-state drive (SSD) accelerated storage. In one embodiment, view 740 includes storage availability indicator 744 for indicating how much storage of each type is available. If, for example, storage of a particular tier is not available, a user will not be able to proceed to the next view of workflow 700.

Figure 7J:
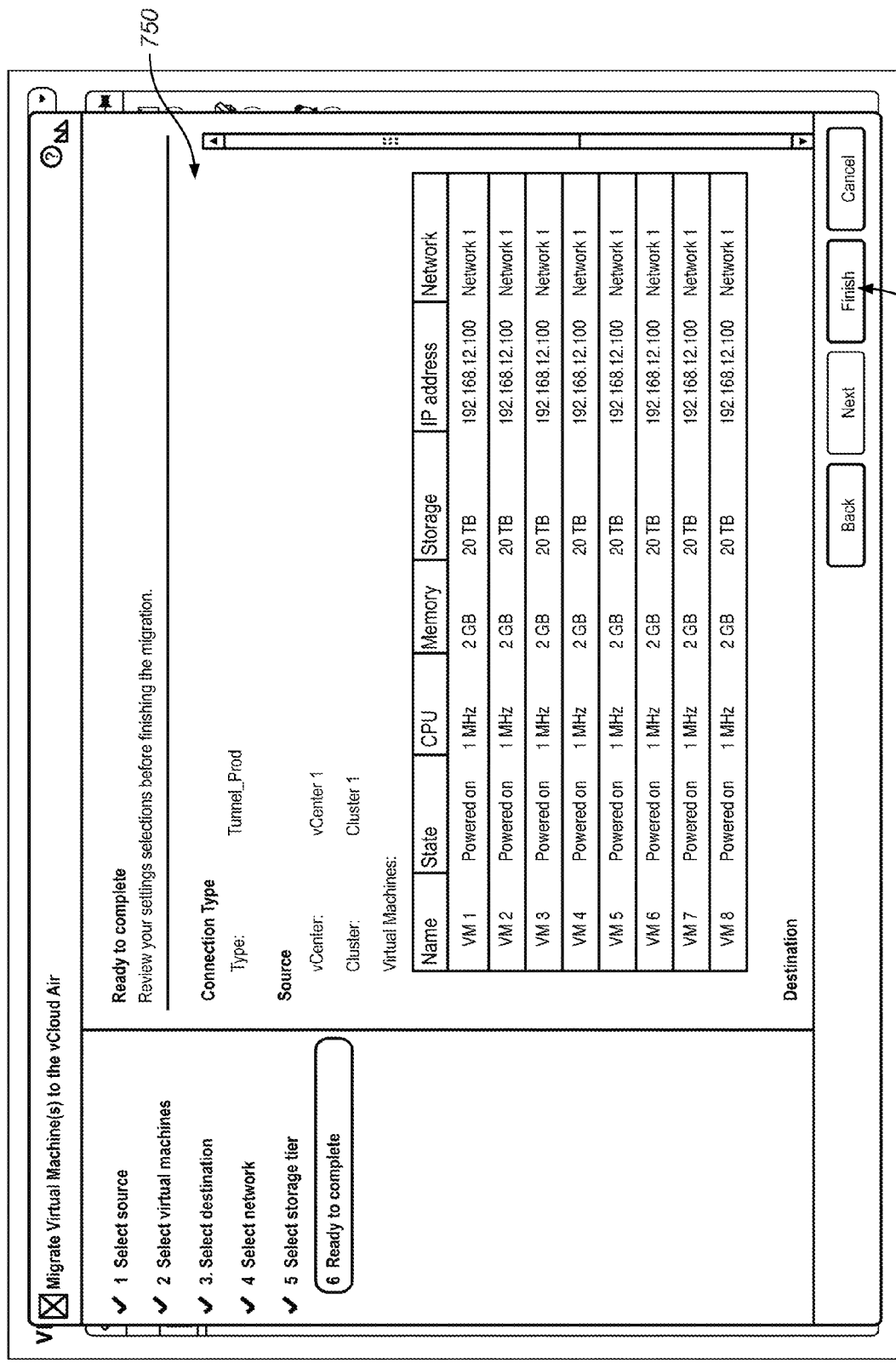

FIG. 7J illustrates a view 750 of workflow 700. View 750 includes a summary of the information selected and/or entered in views 710, 715, 720, 725, 730 and 740. View 750 allows a user to review the configuration of virtual machine migration. View 750 also includes controls for navigating back through workflow 700 and for accepting the configuration presented for establishing the secure tunnel. Responsive to receiving an interaction with control 752, the migration of the selected virtual machine(s) between the local virtualization infrastructure and the cloud-based virtualization infrastructure is performed.

FIG. 7K illustrates a migration dashboard 760 of graphical user interface 300. Migration dashboard 760 illustrates the status of all virtual machine migrations that have been initiated. For example, migration dashboard 760 may show, for each virtual machine, the source of a migration, the destination of the migration, a status update, a percentage complete, a size of the migration, and a remaining time until the migration is complete. The status update may include many types of information, including but not limited to: a completion indicator, a failure indicator, a current migration status, a migration scheduled indicator, and an indicator that the virtual machine is ready to switch to the migrated instance. Using the migration dashboard 760, other features may be available, such as cancelling a migration (or scheduled migration), troubleshooting a migration, or restarting a migration.

Example Methods of Operation

FIGS. 8A-8C illustrate flow diagrams 800, 822 and 824 of example methods for connecting a local virtualization infrastructure with a cloud-based virtualization infrastructure, according to various embodiments. FIGS. 9A and 9B illustrate flow diagrams 900 and 920 of example methods for migrating a virtual machine between a local virtualization infrastructure and a cloud-based virtualization infrastructure, according to various embodiments. Procedures of these methods will be described with reference to elements and/or components of FIGS. 3A-3G, 4A-4E, 5A-5C and 7A-7K. It is appreciated that in some embodiments, the procedures may be performed in a different order than described, that some of the described procedures may not be performed, and/or that one or more additional procedures to those described may be performed. Flow diagrams 800, 822, 824, 900 and 920 include some procedures that, in various embodiments, are carried out by one or more processors under the control of computer-readable and computer-executable instructions that are stored on non-transitory computer-readable storage media. It is further appreciated that one or more procedures described in flow diagrams 800, 822, 824, 900 and 920 may be implemented in hardware, or a combination of hardware with firmware and/or software.

With reference to FIG. 8A, at procedure 810 of flow diagram 800, in various embodiments, a first view 330 comprising a control for connecting the local virtualization infrastructure to the cloud-based virtualization infrastructure is displayed within a graphical user interface 300 for managing the local virtualization infrastructure.

At procedure 820, responsive to a receiving a user selection to connect the local virtualization infrastructure to the cloud-based virtualization infrastructure, at least one workflow for effectuating a connection between the local virtualization infrastructure and the cloud-based virtualization infrastructure is displayed.

In one embodiment, as shown at procedure 822, a secure tunnel creation workflow 400 for creating a secure tunnel between the local virtualization infrastructure and the cloud-based virtualization infrastructure is displayed. In one embodiment, procedure 822 is performed according to the procedures illustrated in FIG. 8B. At procedure 850, a remote gateway selection interface for receiving a selection of a remote gateway of a plurality of remote gateways of the cloud-based virtualization infrastructure is displayed. At procedure 852, a network management services selection interface for receiving a selection of a network management service of the local virtualization infrastructure is displayed. And at procedure 854, a local gateway selection interface for receiving a selection of a local gateway of a plurality of local gateways of the local virtualization infrastructure.

In one embodiment, as shown at procedure 824, a network extension workflow for extending a network between the local virtualization infrastructure and the cloud-based virtualization infrastructure is displayed. In one embodiment, procedure 824 is performed according to the procedures illustrated in FIG. 8C. At procedure 840, a source port group selection interface for receiving a selection of a port group of the local virtualization infrastructure for extending the local virtualization infrastructure to the cloud-based virtualization infrastructure is displayed. At procedure 842, a destination gateway selection interface for receiving a selection of a destination gateway of the cloud-based virtualization infrastructure to extend a selected port group of the local virtualization infrastructure to the cloud-based virtualization infrastructure is displayed.

In one embodiment, as shown at procedure 826, the secure tunnel is generated based at least on a selected remote gateway of the plurality of remote gateways, a selected network management service, and a selected local gateway of the plurality of local gateways.

In one embodiment, as shown at procedure 828, the selected port group of the local virtualization infrastructure is extended to the cloud-based virtualization infrastructure based at least in part of the selected port group and a selected destination gateway.

As shown at procedure 830, responsive to receiving a command to connect the local virtualization infrastructure to the cloud-based virtualization infrastructure at the workflow for effectuating a connection between the local virtualization infrastructure and the cloud-based virtualization infrastructure, a connection between the local virtualization infrastructure and the cloud-based virtualization infrastructure is established according to the at least one workflow.

As shown at procedure 840, responsive to establishing a connection between the local virtualization infrastructure and the cloud-based virtualization infrastructure, management of the local virtualization infrastructure and the cloud-based virtualization infrastructure through the graphical user interface for managing the local virtualization infrastructure is provided.

With reference to FIG. 9A, at procedure 910 of flow diagram 900, in various embodiments, a first view comprising a control for migrating a virtual machine between the local virtualization infrastructure to the cloud-based virtualization infrastructure is displayed within a graphical user interface for managing the local virtualization infrastructure.

At procedure 920, responsive to a receiving a user selection to migrate a virtual machine between the local virtualization infrastructure and the cloud-based virtualization infrastructure, a workflow for effectuating a migration of the virtual machine between the local virtualization infrastructure and the cloud-based virtualization infrastructure is displayed. In one embodiment, procedure 920 is performed according to the procedures illustrated in FIG. 9B.

With reference to FIG. 9B, at procedure 950, a source selection view is displayed within the graphical user interface, the source selection view for receiving a selection of a source of the migration. In one embodiment, as shown at procedure 960, a source selection control for allowing a user to select between browsing by physical component and browsing by network is displayed. At procedure 962, responsive to receiving a selection of browsing by physical component, browsing by physical component within the source selection view is enabled. At procedure 964, responsive to receiving a selection of browsing by network, browsing by network within the source selection view is enabled.

At procedure 952, responsive to receiving a selection of the source of the migration, a virtual machine selection view is displayed within the graphical user interface, the virtual machine selection view for receiving a selection of a virtual machine to migrate. At procedure 954, responsive to receiving a selection of the virtual machine to migrate, a destination selection view is displayed within the graphical user interface, the destination selection view for receiving a selection of a destination of the migration. At procedure 956, responsive to receiving a selection of the destination of the migration, a network selection view is displayed within the graphical user interface, the network selection view for receiving a selection of network of the destination to migrate the virtual machine. At procedure 958, a storage tier selection view is displayed within the graphical user interface, the storage tier selection view for receiving a selection of a storage tier for the virtual machine.

At procedure 930, responsive to receiving a command to migrate the virtual machine between the local virtualization infrastructure and the cloud-based virtualization infrastructure at the workflow for effectuating a migration of the virtual machine between the local virtualization infrastructure and the cloud-based virtualization infrastructure, the virtual machine is migrated between the local virtualization infrastructure and the cloud-based virtualization infrastructure. In one embodiment, the virtual machine is migrated from the local virtualization infrastructure to the cloud-based virtualization infrastructure. In another embodiment, the virtual machine is migrated from the cloud-based virtualization infrastructure to the local virtualization infrastructure.

At procedure 940, responsive to migrating the virtual machine between the local virtualization infrastructure and the cloud-based virtualization infrastructure, management of the virtual machine through the graphical user interface for managing the local virtualization infrastructure is provided. In one embodiment, as shown at procedure 942, a migration dashboard for providing status information on the migration of the virtual machine is displayed.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for migrating a first virtual machine between a local virtualization infrastructure and a cloud-based virtualization infrastructure that is separate and remote from the local virtualization infrastructure, the method comprising:
    displaying, within a graphical user interface (GUI) for managing the local virtualization infrastructure, a first view comprising a first GUI element for migrating a virtual machine between the local virtualization infrastructure and the cloud-based virtualization infrastructure;
    responsive to receiving a user selection of the first GUI element, displaying a source selection view comprising a second GUI element for selecting a source comprising a plurality of virtual machines, the plurality including the first virtual machine;
    responsive to receiving a user selection of the second GUI element, displaying a workflow view comprising the plurality of virtual machines and a selection element associated with each of the plurality of virtual machines;
    responsive to receiving a user selection of the selection element associated with the first virtual machine, displaying a destination selection view for selecting between one or more destinations for migrating the first virtual machine, the one or more destinations comprising the cloud-based virtualization infrastructure; and
    responsive to receiving a user selection of the cloud-based virtualization infrastructure, migrating the first virtual machine between the local virtualization infrastructure and the cloud-based virtualization infrastructure.

2. The computer-implemented method of claim 1, wherein migrating the first virtual machine between the local virtualization infrastructure and the cloud-based virtualization infrastructure comprises:
    migrating the first virtual machine from the local virtualization infrastructure to the cloud-based virtualization infrastructure.

3. The computer-implemented method of claim 1, wherein migrating the first virtual machine between the local virtualization infrastructure and the cloud-based virtualization infrastructure comprises:
    migrating the first virtual machine from the cloud-based virtualization infrastructure to the local virtualization infrastructure.

4. The computer-implemented method of claim 1, wherein the destination selection view comprises a network selection option for selecting a network of the destination to migrate the first virtual machine.

5. The computer-implemented method of claim 1, further comprising:
    displaying a storage tier selection view within the graphical user interface, the storage tier selection view for receiving a selection of a storage tier for the first virtual machine.

6. The computer-implemented method of claim 1, wherein displaying the source selection view within the graphical user interface comprises:
    displaying a source selection control for allowing a user to select between browsing by physical component and browsing by network;
    responsive to receiving of selection of browsing by physical component, enabling browsing by physical component within the source selection view; and
    responsive to receiving of selection of browsing by network, enabling browsing by network within the source selection view.

7. The computer-implemented method of claim 1, wherein migrating the first virtual machine between the local virtualization infrastructure and the cloud-based virtualization infrastructure comprises:
    displaying a migration dashboard for providing status information on the migration of the first virtual machine.

8. A non-transitory computer readable storage medium having computer readable program code stored thereon for causing a computer system to perform a method for migrating a first virtual machine between a local virtualization infrastructure and a cloud-based virtualization infrastructure that is separate and remote from the local virtualization infrastructure, the method comprising:
    displaying, within a graphical user interface (GUI) for managing the local virtualization infrastructure, a first view comprising a first GUI element for migrating a virtual machine between the local virtualization infrastructure and the cloud-based virtualization infrastructure;
    responsive to receiving a user selection of the first GUI element, displaying a source selection view comprising a second GUI element for selecting a source comprising a plurality of virtual machines, the plurality including the first virtual machine;
    responsive to receiving a user selection of the second GUI element, displaying a workflow view comprising the plurality of virtual machines and a selection element associated with each of the plurality of virtual machines;
    responsive to receiving a user selection of the selection element associated with the first virtual machine, displaying a destination selection view for selecting between one or more destinations for migrating the first virtual machine, the one or more destinations comprising the cloud-based virtualization infrastructure; and
    responsive to receiving a user selection of the cloud-based virtualization infrastructure, migrating the first virtual machine between the local virtualization infrastructure and the cloud-based virtualization infrastructure.

9. The non-transitory computer readable storage medium of claim 8, wherein migrating the first virtual machine between the local virtualization infrastructure and the cloud-based virtualization infrastructure comprises:
    migrating the first virtual machine from the local virtualization infrastructure to the cloud-based virtualization infrastructure.

10. The non-transitory computer readable storage medium of claim 8, wherein migrating the first virtual machine between the local virtualization infrastructure and the cloud-based virtualization infrastructure comprises:
    migrating the first virtual machine from the cloud-based virtualization infrastructure to the local virtualization infrastructure.

11. The non-transitory computer readable storage medium of claim 8, wherein the destination selection view comprises a network selection option for selecting a network of the destination to migrate the virtual machine.

12. The non-transitory computer readable storage medium of claim 8, the method further comprising:
    displaying a storage tier selection view within the graphical user interface, the storage tier selection view for receiving a selection of a storage tier for the first virtual machine.

13. The non-transitory computer readable storage medium of claim 8, wherein displaying the source selection view within the graphical user interface comprises:
    displaying a source selection control for allowing a user to select between browsing by physical component and browsing by network;
    responsive to receiving of selection of browsing by physical component, enabling browsing by physical component within the source selection view; and
    responsive to receiving of selection of browsing by network, enabling browsing by network within the source selection view.

14. The non-transitory computer readable storage medium of claim 8, wherein migrating the virtual machine between the local virtualization infrastructure and the cloud-based virtualization infrastructure comprises:
    displaying a migration dashboard for providing status information on the migration of the first virtual machine.

15. In a computer system having a graphical user interface (GUI) including a display device and a user interface selection device, a method for migrating a first virtual machine between a local virtualization infrastructure and a cloud-based virtualization infrastructure that is separate and remote from the local virtualization infrastructure, the method comprising:
    providing a graphical user interface for managing the local virtualization infrastructure, the graphical user interface comprising:
        a first view comprising a first GUI element for migrating a virtual machine between the local virtualization infrastructure and the cloud-based virtualization infrastructure; and
        a source selection view comprising a second GUI element for selecting a source comprising a plurality of virtual machines, the plurality including the first virtual machine, wherein the source selection view is displayed responsive to a receiving a user selection of the first GUI element;
    responsive to receiving a user selection of the second GUI element, displaying a workflow view comprising the plurality of virtual machines and a selection element associated with each of the plurality of virtual machines;
    responsive to receiving a user selection of the selection element associated with the first virtual machine, displaying a third GUI element for selecting between one or more destinations for migrating the first virtual machine, the one or more destinations comprising the cloud-based virtualization infrastructure; and
    responsive to receiving a user selection of the cloud-based virtualization infrastructure, migrating the first virtual machine between the local virtualization infrastructure and the cloud-based virtualization infrastructure.

16. The method of claim 15, wherein the source selection view further comprises a source selection control for allowing a user to select between browsing by physical component and browsing by network.

17. The method of claim 15, wherein the destination selection view comprises a network selection option for selecting a network of the destination to migrate the first virtual machine.

18. The method of claim 15, the graphical user interface further comprising:
    a migration dashboard for providing status information on the migration of the first virtual machine.

* * * * *